United States Patent [19]
Sugata

[11] Patent Number: 5,907,429
[45] Date of Patent: May 25, 1999

[54] OPTICAL AMPLIFIER

[75] Inventor: Akihiko Sugata, Kawasaki, Japan

[73] Assignee: Fujitsu Limited, Kawasaki, Japan

[21] Appl. No.: 08/982,646

[22] Filed: Dec. 2, 1997

[30] Foreign Application Priority Data

Mar. 19, 1997 [JP] Japan .................................. 9-066942

[51] Int. Cl.$^6$ .......................... H01S 3/131; H04B 10/00
[52] U.S. Cl. ........................ 359/341; 359/160; 359/337
[58] Field of Search ................................ 359/134, 160, 359/337, 341

[56] References Cited

U.S. PATENT DOCUMENTS

| | | | |
|---|---|---|---|
| 5,138,621 | 8/1992 | Gato et al. | 372/28 |
| 5,463,487 | 10/1995 | Epworth | 359/124 |
| 5,664,131 | 9/1997 | Sugiya | 359/341 |
| 5,680,247 | 10/1997 | Okuno | 359/141 |
| 5,764,404 | 6/1998 | Yamane et al. | 359/341 |

FOREIGN PATENT DOCUMENTS

| | | |
|---|---|---|
| 5129701 | 2/1993 | Japan . |
| 5-129701 | 5/1993 | Japan . |

OTHER PUBLICATIONS

Lachel et al, Conf. Opt. Fifer Commun. vol. 6, pp. 84–85, Feb. 21, 1997; Abst, only herewith.

*Primary Examiner*—Nelson Moskowitz
*Attorney, Agent, or Firm*—Staas & Halsey

[57] ABSTRACT

An optical amplifier is disclosed, which comprises an optical amplifying unit for amplifying an optical signal, a light output monitoring unit for monitoring the light output of the optical amplifying unit, a control unit for controlling the optical amplifying unit by comparing the light output of the optical amplifying unit monitored by the light output monitoring unit with a specified reference value so as to cause the light output of the optical amplifying unit to take a predetermined output value and an input light level detecting unit for detecting the input light level of the optical signal. The control unit controls the light output level of the optical amplifying unit by changing the reference value used for comparison according to the input light level detected by the input light level detecting unit. By employing simple means for controlling the gain of the optical amplifying unit according to the input light level of the optical signal to be inputted, proper amplification control is performed without making the optical amplifier complex even when a change occurs in the number of input wavelengths.

16 Claims, 28 Drawing Sheets

OPTICAL AMPLIFIER

BACKGROUND OF THE INVENTION

(1) Field of the Invention

The present invention relates to an optical amplifier which is suitably used for a wavelength multiplexed optical transmission system.

(2) Description of the Related Art

In a trunk line optical communication system, with the attainment of a high speed designed for lengthening a distance and increasing a capacity in recent years, optical modulators and electronic circuits which can deal with such a situation have been developed. However, it has been extremely difficult to provide an electronic circuit to be used in a region of 10 Gb/s or higher. Accordingly, a study has also been made on a system which can attain large capacitance for the transmission of an optical signal by using a wavelength multiplexing technology.

Referring to FIG. 26, there is shown a typical wavelength multiplexed optical transmission system. This wavelength multiplexed optical transmission system denoted by a code 80 includes terminal stations 20A, 20B and 20c, a repeater station 20D and optical amplifiers 20a to 20f.

The terminal stations 20A, 20B and 20C are points in which transmitting and receiving of information are performed through an optical fiber.

Each of the terminal stations has transmitting and receiving units. The repeater station 20D performs a relaying operation according to information regarding a terminal station to which information should be transmitted from a certain terminal station. For example, the repeater station 20D has a signal branching unit or a signal dividing unit, and divides an optical signal having certain wavelength information from the terminal station 20A into portions having wavelength information appropriate for the terminal stations 20B and 20C.

The optical amplifiers 20a to 20f amplify optical signals among the terminal stations 20A to 20C interconnected by the optical fiber. The power of a light attenuated during transmission of an optical signal is amplified. The repeater station 20D also has built-in optical amplifiers similar to the optical amplifiers 20a to 20f.

With the wavelength multiplexed optical transmission system 80 shown in FIG. 26, when a multiple optical signal having a plurality of wavelengths is to be transmitted from the terminal station 20A to the terminal stations 20B and 20C, an optical signal having wavelengths of, for instance $\lambda 1$ to $\lambda 4$, from the terminal station 20A, is divided into some portions by the repeater station 20D. Then, the portions of the optical signal having wavelengths of, for instance $\lambda 1$ and $\lambda 3$, are transmitted to the terminal station 20B, and the portions of the optical signal having wavelengths of, for instance $\lambda 2$ and $\lambda 4$, are transmitted to the terminal station 20C. During this period, the portions of the optical signal are amplified by the optical amplifiers 20a to 20f in order to prevent the portions of the signal to be transmitted from being attenuated.

Referring to FIG. 27 which is a block diagram, there is shown an example of a 4-wave multiplex transmitting unit in a typical optical transmission system. This 4-wave multiplex transmitting unit includes light sources 81-1 to 81-4, modulators 82-1 to 82-4, driving circuits 831 to 83-4 and a coupler 85.

The light sources 81-1 to 81-4 output optical signals having specified wavelengths ($\lambda 1$ to $\lambda 4$). The modulators (MOD1 to MOD4) 82-1 to 82-4 modulate the optical signals outputted from the light sources 81-1 to 81-4 by signals from the later-described driving circuits 83-1 to 83-4. The coupler 85 synthesizes outputs (multiplexes wavelengths) from the modulators 82-1 to 82-4.

The driving circuits (DRIV1 to DRIV4) 83-1 to 83-4 drive the modulators 82-1 to 82-4 respectively based on main signals (data signals; DATA1 to DATA4).

With the 4-wave multiplex transmitting unit, optical signals having various wavelengths ($\lambda 1$ to $\lambda 4$) are modulated by the modulators 82-1 to 82-4.

These modulated optical signals are multiplexed by the coupler 85 and then outputted to the optical amplifiers.

Referring now to FIG. 28 which is a block diagram, there is shown a constitution of a typical optical amplifier. This optical amplifier denoted by a code 90 includes an optical amplifying unit 91, a light branching circuit 92, a light receiver 93, a comparator 94 and a pumping light source control circuit 95. The optical amplifying unit 91 amplifies an optical signal which has been inputted. The inputted optical signal was multiplexed by the coupler 85 in the previous stage. For this optical amplifying unit 91, for instance, a unit composed by combining an erbium doped optical fiber (referred to as EDF, hereinafter) with a pumping light source (referred to as LD; LASER DIODE, hereinafter) for supplying an exciting light to this EDF is used. The light branching circuit 92 branches a portion of the optical signal amplified by the optical amplifying unit 91. This circuit 92 includes, for instance an optical coupler.

The light receiver 93 converts the optical signal branched by the light branching circuit 92 into an electric signal by using a receiving element. The comparator 94 compares an output from the light receiver 93 with a specified reference value (REFERENCE). The pumping control circuit (PUMP LD CONTROL CIRCUIT) 95 receives an output from the comparator 94, adjusts an output from the pumping light source of the optical amplifying unit 91 and corrects its deviation from the reference value.

With the optical amplifier 90 constructed in the above-noted manner, after a portion of an inputted optical signal is branched and compared with a specified value, the gain of the optical amplifying unit 91 is controlled based on the result of this comparison. Accordingly, an average value among lights outputted from the optical amplifier 90 can be maintained constant.

However, there is a problem inherent in the system, which employs optical amplification relaying like that described above. More particularly, since a stable transmission system is realized by always maintaining constant an average value among lights outputted from the optical amplifier 90 and regulating the fluctuation of light receiving power for the terminal stations 20A to 20C, even in the case of N-wavelength multiplex transmission in which a plurality (N) of wavelengths are multiplexed, power for respective wavelengths based on average value control can be maintained constant if the input levels of the wavelengths are the same. However, for example, if a wavelength path is switched to another in the middle way of a transmission line or if the number of wavelengths for an input signal is reduced in the optical amplifier 90 because of a failure or maintenance work, average value control like that described above only results in the increase of output power for the respective wavelengths.

In other words, for N-wavelength multiplex transmission, if the average output power of the optical amplifier 90 is Po, light power per wave for the output of this optical amplifier 90 is PoN. In this condition, if no m waves contained in N waves (m<N) are inputted any longer for one reason or another, light power per wave for the output of the optical amplifier 90 becomes Po/(N−m) and thus power per wave is increased.

To further describe the foregoing problem by taking a 2-wave multiplexing system as an example, assuming that power for each wavelength outputted from the optical amplifier 90 is +6 dBm, when an optical signal inputted to the optical amplifier 90 is reduced from two waves to one wave because of a failure or the like, output power of one wave outputted from the optical amplifier 90 is increased by 3 dB to be +9 dBm. If this power exceeds a threshold value in which an optical fiber nonlinear effect (SBS; stimulated Brillouin scattering, SPM; self phase modulating effect, or the like) is produced, a light waveform is deteriorated and thus transmission quality is also deteriorated.

Efforts have been made to develop a technology as means for solving the above-discussed problem. For example, referring to JP-A-95097/1996, there is disclosed a technology for always keeping a signal light output for each wavelength at a proper level by controlling the light output level of an optical amplifier so as to change the level according to the number of multiple signals in a wavelength multiplexed light signal when the wavelength multiplexed light signal produced by multiplexing an optical signal having a plurality of different wavelengths is to be amplified.

However, with the technology disclosed in JP-A-95097/1996, since the number of wavelength multiplexed light signals is directly detected and the light output level of the optical amplifier is controlled according to this detected number of wavelength multiplexed light signals, means for detecting the number of wavelength multiplexed light signals inevitably becomes complex. Consequently, the optical amplifier as a whole becomes complex and costs are increased.

SUMMARY OF THE INVENTION

The present invention was made in order to solve the problems discussed above. It is a first object of the present invention to provide an optical amplifier, which is not made complex and can perform proper amplification control even when a change occurs in the number of input wavelengths by employing simple detecting means for controlling the gain of an optical amplifying unit according to the input light level of an optical signal to be inputted.

It is a second object of the present invention to provide an optical amplifier, which can maintain stable transmission quality without increasing output power even when a change occurs in the number of input wavelengths by supplying a compensating optical signal to the input side of an optical amplifying unit so as to control a light output level to a specified level according to information regarding the number of multiple signals for an optical signal to be inputted.

It is a third object of the present invention to provide an optical amplifier, which can shorten a time until its operation is normally started and adjust the shortage of a compensating optical signal based on gain control by simultaneously performing supplying of a compensating optical signal to the input side of an optical amplifying unit and controlling of the gain of the optical amplifying unit according to the input light level of an optical signal to be inputted.

In order to achieve the first object, according to an aspect of the present invention, there is provided an optical amplifier for amplifying a wavelength multiplexed signal produced by multiplexing an optical signal having a plurality of wavelengths and controlling an amplification gain so as to cause an amplified output to take a fixed value, which comprises an optical amplifying unit for amplifying an optical signal to be inputted, a light output monitoring unit for monitoring the light output of the optical amplifying unit, a control unit for controlling the optical amplifying unit by comparing the light output of the optical amplifying unit monitored by the light output monitoring unit with a specified reference value so as to cause the light output of the optical amplifying unit to take a predetermined output value and an input light level detecting unit for detecting the input light level of the optical signal to be inputted. The control unit changes the reference value used for comparison according to an input light level detected by the input light level detecting unit and thereby controls the light output level of the optical amplifying unit.

With the optical amplifier constructed in the above-noted manner, since gain control can be performed for the optical amplifying unit according to the input light level of the optical signal to be inputted, even when a change occurs in the number of multiplexed wavelengths, the number of multiplexed wavelengths can be easily detected without making a circuitry complex unlike the optical amplifier for directly detecting the number of wavelengths. Accordingly, the optical amplifier can be simplified and its performance as a whole can be greatly improved.

In addition, since the optical amplifier enables sure detection of the number of multiplexed wavelengths, output power for each wavelength can be maintained constant and highly reliable transmission quality is assured without any reduction in the quality of a light waveform.

In order to achieve the second object, according to another aspect of the present invention, there is provided an optical amplifier for amplifying a wavelength multiplexed signal produced by multiplexing an optical signal having a plurality of wavelengths, which is constructed in such a manner that the light output level of the optical amplifier is controlled to a specified level by supplying a compensating optical signal to the input side of an optical amplifying unit according to multiple signal number information regarding an optical signal to be inputted.

This optical amplifier for amplifying a wavelength multiplexed signal produced by multiplexing an optical signal having a plurality of wavelengths comprises an optical amplifying unit for amplifying an optical signal to be inputted, a light output monitoring unit for monitoring the light output of the optical amplifying unit, a control unit for controlling the optical amplifying unit by comparing the light output of the optical amplifying unit monitored by the light output monitoring unit with a specified reference value so as to cause the light output of the optical amplifying unit to take a predetermined output value, a multiple signal number detecting unit for detecting multiple signal number information regarding the optical signal to be inputted, a compensating optical signal generation light source for supplying a compensating optical signal to the input side of the optical amplifying unit and a light source control unit for controlling the compensating optical signal generation light source according to the multiple signal number information detected by the multiple signal number detecting unit so as to cause the light source to output the compensating optical signal, which in turn causes the light output level of the optical amplifying unit to take a specified level.

With the optical amplifier constructed in the above-noted manner, since a compensating optical signal is supplied to the input side of the optical amplifying unit according to the multiple signal number of an optical signal to be inputted, output power for each wavelength can be controlled to a constant level without changing the circuitry of the feedback control system of the existing optical amplifying unit.

In order to achieve the third object, according to yet another aspect of the present invention, there is provided an optical amplifier for amplifying a wavelength multiplexed signal produced by multiplexing an optical signal having a plurality of wavelengths, which is constructed in such a manner that a compensating optical signal is supplied to the input side of an optical amplifying unit and the light output level of the optical amplifier is controlled according to multiple signal number information regarding an optical signal to be inputted.

This optical amplifier for amplifying a wavelength multiplexed signal produced by multiplexing an optical signal having a plurality of wavelengths comprises an optical amplifying unit for amplifying an optical signal to be inputted, a light output level monitoring unit for monitoring the light output of the optical amplifying unit, a control unit for controlling the optical amplifying unit by comparing the light output of the optical amplifying unit monitored by the light output monitoring unit with a specified reference value so as to cause the light output of the optical amplifying unit to take a predetermined value, a multiple signal number detecting unit for detecting multiple signal number information regarding the optical signal to be inputted, a compensating optical signal generation light source for supplying a compensating optical signal to the input side of the optical amplifying unit and a light source control unit for controlling the compensating optical signal generation light source according to the multiple signal number information detected by the multiple signal number detecting unit so as to cause the light source to output the compensating optical signal, which in turn causes the light output level of the optical amplifying unit to take a specified level. The control unit changes the reference value used for comparison according to the multiple signal number information regarding the optical signal to be inputted, which is detected by the multiple signal number information detecting unit, and thereby controls the light output level of the optical amplifying unit.

With the optical amplifier constructed in the above-noted manner, since supplying of a compensating optical signal and the gain control of the optical amplifying unit can be simultaneously performed based on multiple signal number information, a time needed until the compensating optical signal is normally started (transition state) can be shortened by controlling performed by the feedback system having quicker responsiveness and the number of wavelengths equivalent to the shortage of optical signals can be adjusted by controlling performed by the feedback system irrespective of the number of installed light sources (compensating optical signal quantity). Accordingly, a circuitry can be reduced in size and degree of flexibility can be increased when a system is constructed.

BRIEF DESCRIPTION OF THE DRAWINGS

These and other objects, features and advantages of the present invention will become more apparent upon reading of the following detailed description and drawings, in which:

FIGS. 15(a) to 15((c) are timing charts respectively illustrating the operation of the wavelength detecting circuit of the multiple signal number detecting unit shown in FIG. 12;

DESCRIPTION OF THE PREFERRED EMBODIMENTS (a) Aspects of the Invention

First, the aspects of the present invention will be described with reference to the accompanying drawings.

Figure 1:
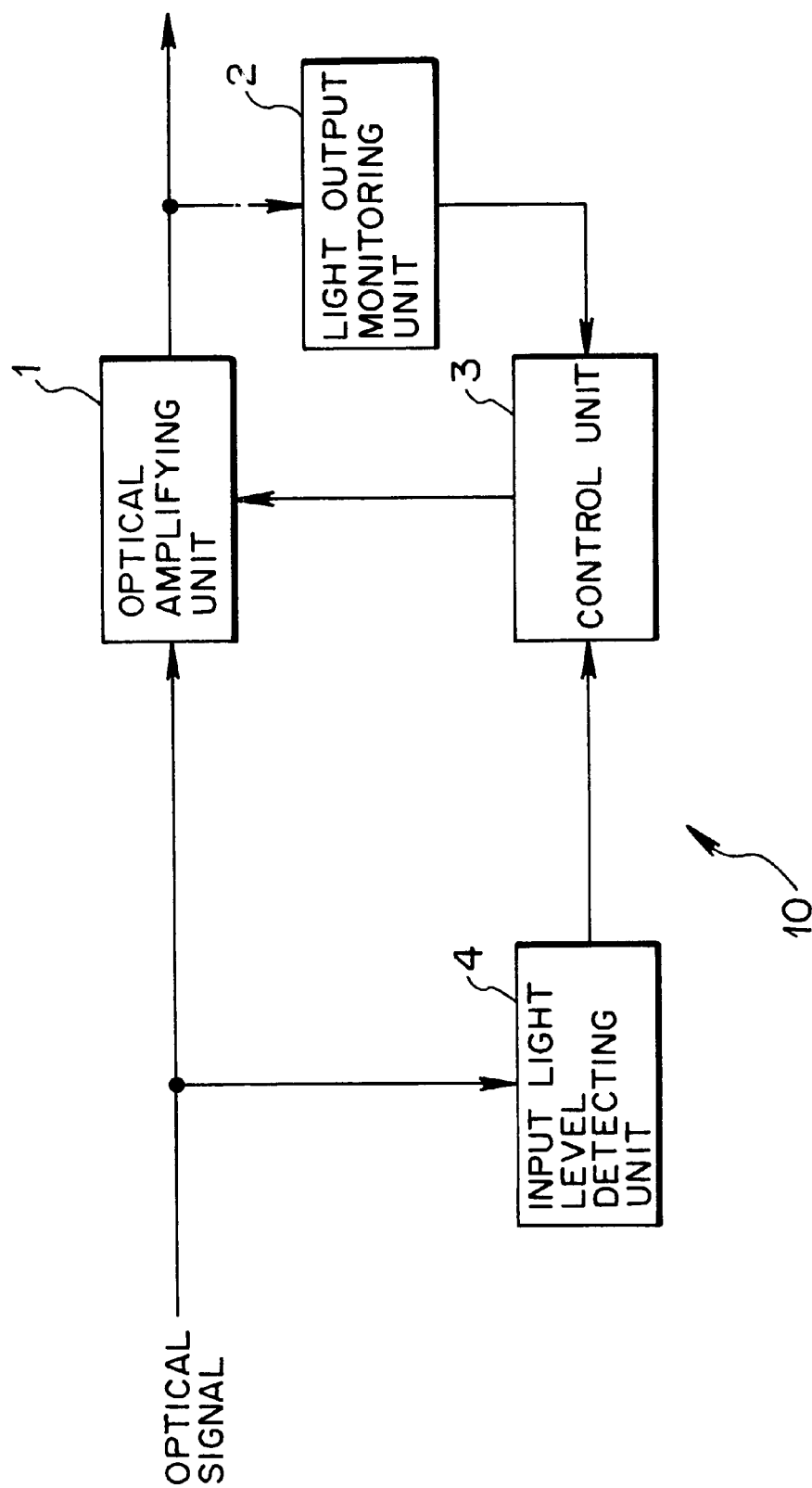
FIG. 1 is a block diagram showing an aspect of the present invention.

Referring to FIG. 1 which is a block diagram showing an aspect of the present invention, an optical amplifier 10 shown comprises an optical amplifying unit 1, a light output monitoring unit 2, a control unit 3 and an input light level detecting unit 4.

The optical amplifying unit 1 amplifies an optical signal which has been inputted. The light output monitoring unit 2 monitors the light output of the optical amplifying unit 1. The control unit 3 controls the optical amplifying unit 1 by comparing the light output of the optical amplifying unit 1 monitored by the light output monitoring unit 2 with a specified reference value so as to cause the light output of the optical amplifying unit 1 to take a predetermined output value. The input light level detecting unit 4 detects the input light level of the optical signal which has been inputted. In the control unit 3, the light output level of the optical amplifying unit 1 is controlled by changing the reference value used for comparison according to the input light level detected by the input light level detecting unit 4.

In this case, the input light level detecting unit 4 may include a light receiving unit for receiving an optical signal which has been inputted and a reference value change information supplying unit for supplying reference value change information to the control unit 3 by comparing information regarding the received light detected by this light receiving unit with a preset auxiliary reference value according to a multiple signal number.

With the optical amplifier 10 of the present invention, since the gain of the optical amplifying unit 1 can be controlled according to the input light level of an optical signal which has been inputted, compared with the optical amplifier for directly detecting the number of wavelengths, the number of multiplexed wavelengths can be easily detected without making a circuitry complex even when a change occurs in the number of multiplexed wavelengths. Accordingly, the optical amplifier can be simplified and its performance as a whole can be greatly improved.

Also, since the number of multiplexed wavelengths can be surely detected, output power for each wavelength can be maintained constant and highly reliable transmission quality is assured without any reduction in the quality of a light waveform.

Furthermore, the input light level detecting unit 4 may include a light receiving unit for receiving an optical signal which has been inputted, a received light change information arithmetic unit for calculating information regarding a change in received light information between two points of time, which has been detected by this light receiving unit, and a reference value change information supplying unit for supplying reference value change information to the control unit 3 by comparing the received light information detected by the light receiving unit with a preset auxiliary reference value according to a multiple signal number by using the change information about the received light information between the two points of time obtained by this received light change information arithmetic unit as a trigger signal.

With the optical amplifier 10 of the present invention, in addition to its simplified constitution, since the gain of the optical amplifying unit is controlled when a change occurs in received light information between the two points of time, efficient comparison can be performed without being influenced by a fluctuation in a received light quantity after the passage of time. Accordingly, the performance of the optical amplifier can be improved and power consumption can be reduced.

Figure 2:
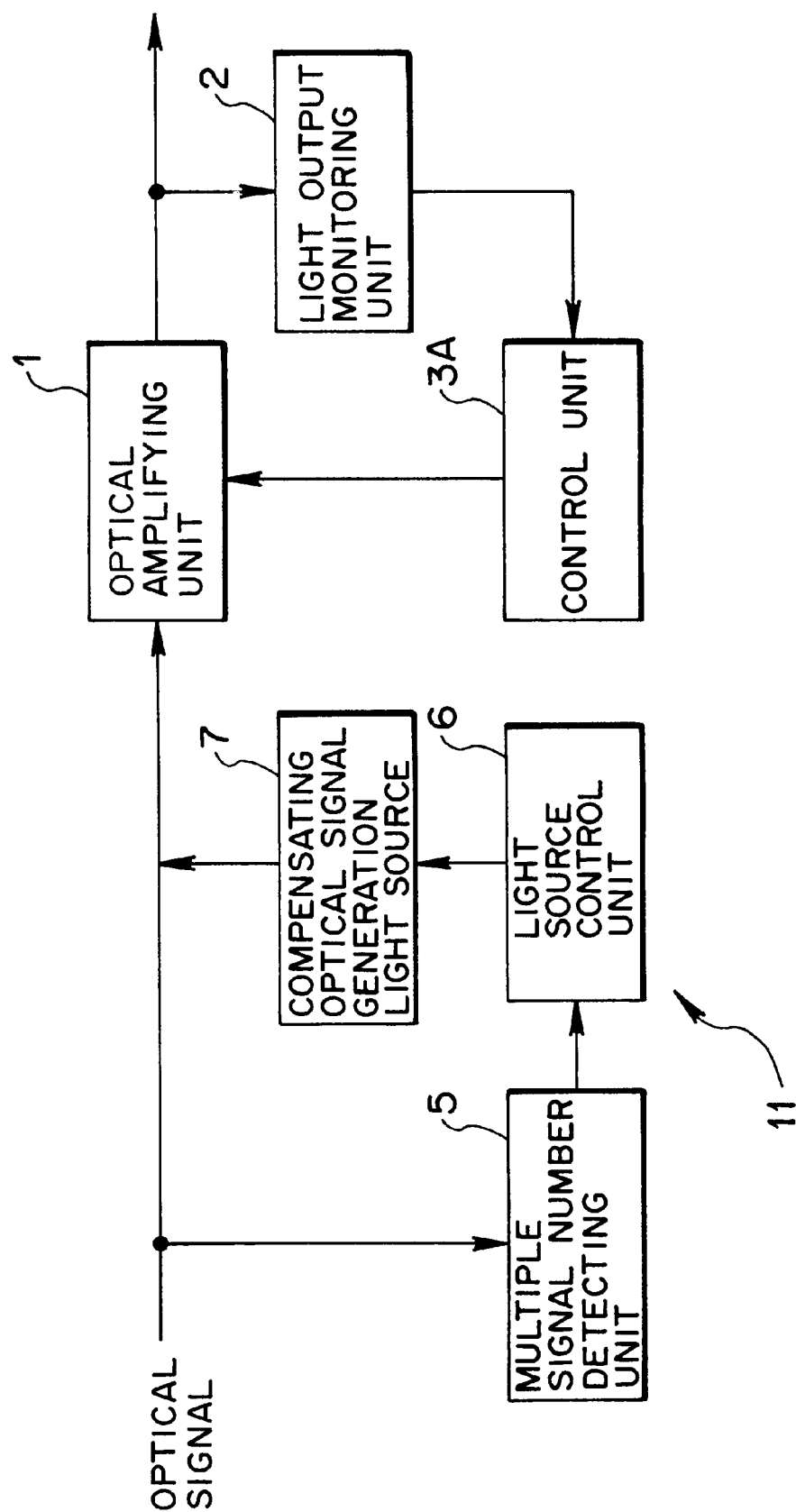
FIG. 2 is a block diagram showing another aspect of the present invention.

Referring now to FIG. 2 which is a block diagram showing another aspect of the present invention, an optical amplifier 11 shown comprises an optical amplifying unit 1, a light output monitoring unit 2, a control unit 3A, a multiple signal number detecting unit 5, a light source control unit 6 and a compensating optical signal generation light source 7. The codes similar to those described above denote like elements or almost like elements and thus, detailed description thereof will be omitted.

The control unit 3A controls the optical amplifying unit 1 by comparing the light output of the optical amplifying unit 1 monitored by the light output monitoring unit 2 with a specified reference value so as to cause the light output of the optical amplifying unit 1 to take a predetermined output value. The specified reference value is a fixed value.

The multiple signal number detecting unit 5 detects multiple signal number information regarding an optical signal which has been inputted. The compensating optical signal generation light source 7 supplies a compensating optical signal to the input side of the optical amplifying unit 1. The light source control unit 6 controls the compensating optical signal generation light source 7 according to the multiple signal number information detected by the multiple signal number detecting unit 5 so as to cause the light source 7 to output a compensating optical signal, which in turn causes the light output level of the optical amplifying unit 1 to take a specified level.

In this case, the multiple signal number detecting unit 5 may include a light receiving unit for receiving an optical signal which has been inputted and a filter unit for detecting multiple signal number information from received light information detected by this light receiving unit. The filter unit may include a plurality of filters in order to deal with a plurality of wavelengths.

With the optical amplifier 11 of the present invention thus constructed, since a compensating optical signal is supplied to the input side of the optical amplifying unit 1 according to a multiple signal number for an optical signal which has been inputted, output power for each wavelength can be controlled to a constant level without changing the circuitry of the feedback control system of the existing optical amplifying unit.

In addition, in order to deal with a plurality of wavelengths, the multiple signal number detecting unit 5 may include a wavelength variable filter which can make a filter wavelength variable.

With the optical amplifier 11 of the present invention thus constructed, since an omitted wavelength can be detected by using the wavelength variable filter for making a filter wavelength variable, a circuitry can be reduced in size. Accordingly, the optical amplifier can be greatly reduced in weight.

The multiple signal number detecting unit 5 may also include a spectroscope unit for dispersing a light for an optical signal which has been inputted by considering wavelengths and a light receiving unit for individually receiving the lights obtained by dispersing performed by this spectroscope unit.

With the optical amplifier 11 of the present invention thus constructed, since an optical signal which has been inputted can be independently received, wavelength information can be surely detected. Accordingly, degree of flexibility can be greatly increased when a system is constituted for the optical amplifier.

The multiple signal number detecting unit 5 may further include a light receiving unit for receiving an optical signal which has been inputted and a multiple signal number output unit for outputting multiple signal number information from information regarding the received light detected by this light receiving unit.

With the optical amplifier 11 of the present invention thus constructed, since a compensating optical signal can be controlled according to an input light level, a circuitry can be simplified compared with the optical amplifier for directly detecting the number of wavelengths. Accordingly, the optical amplifier can be reduced in weight and costs can be reduced.

In order to deal with a plurality of wavelengths, the compensating optical signal generation light source 7 may include a plurality of light sources or a light source which can make a transmitted wavelength variable. This compensating optical signal generation light source 7 can also supply a compensating optical signal in which control information is superimposed on another to the input side of the optical amplifying unit 1.

With the optical amplifier 11 of the present invention thus constructed, since a compensating optical signal is supplied to the input side of the optical amplifying unit 1 according to a multiple signal number for an optical signal which has been inputted, output power for each wavelength can be controlled to a constant level without changing the circuitry of the feedback control system of the existing optical amplifying unit.

Furthermore, with the optical amplifier 11 of the present invention constructed in the above-noted manner, since a reference value is obtained according to detected wavelengths and the number of multiplexed wavelengths by using the wavelength variable filter for making a filter wavelength variable, a circuitry can be reduced in size. Accordingly, the entire optical amplifier can be greatly reduced in size and weight.

Figure 3:
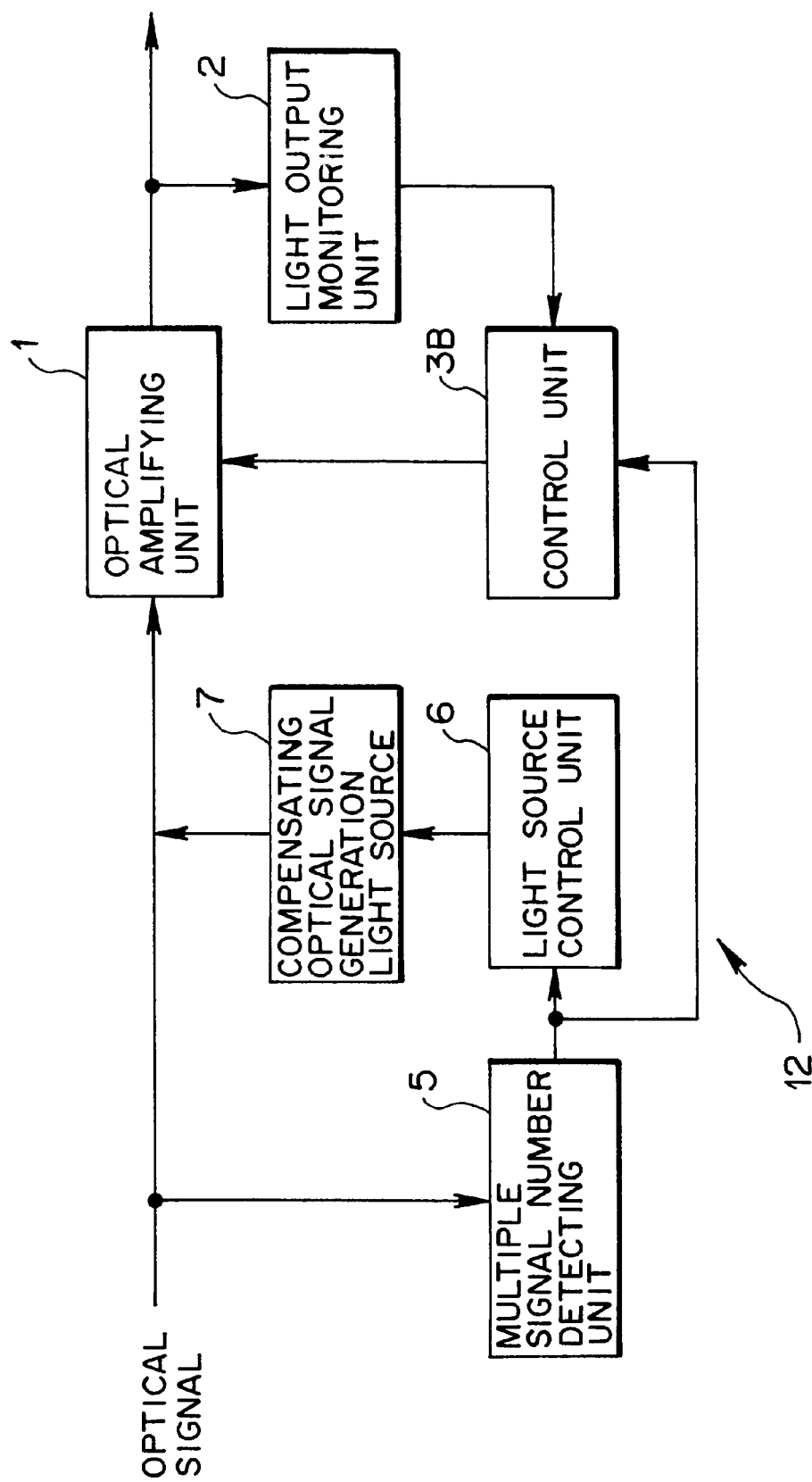
FIG. 3 is a block diagram showing yet another aspect of the present invention.

Referring now to FIG. 3 which is block diagram showing yet another aspect of the present invention, an optical amplifier 12 shown comprises, as in the case of the optical amplifier 11 shown in FIG. 2, an optical amplifying unit 1, a light output monitoring unit 2, a control unit 3B, a multiple signal number detecting unit 5, a light source control unit 6 and a compensating optical signal generation light source 7.

In this case, the optical amplifier 12 is constructed in such a manner that according to multiple signal number information regarding an optical signal which has been inputted, a compensating optical signal is supplied to the input side of the optical amplifying unit 1 and the light output level of the optical amplifier 12 is controlled. Specifically, the control unit 3B controls the light output level of the optical amplifying unit 1 by changing a reference value used for comparison according to information regarding the multiple signal number detected by the multiple signal number detecting unit 5 for an optical signal which has been inputted. The other codes similar to those described above denote like elements or almost like elements and thus, description thereof will be omitted.

The multiple signal number detecting unit 5 may include a reference value change information supplying unit for supplying reference value change information to the control unit 3B according to the detected multiple signal number information.

With the optical amplifier 12 of the present invention constructed in the above-noted manner, since supplying of a compensating optical signal based on the multiple signal number information and controlling of the gain of the optical amplifier 12 can be simultaneously performed, a time needed until the compensating optical signal is normally started (transition state) can be shortened by controlling of a feedback system having quicker responsiveness and the number of wavelengths equivalent to the shortage of optical signals can be adjusted by controlling of the feedback system irrespective of the number of installed light sources (quantity of compensating optical signal). Accordingly, a circuitry can be reduced in size and degree of flexibility can be increased when a system is constituted.

Next, the preferred embodiments of the present invention will be described with reference to the accompanying drawings.

(b) First Embodiment of the Invention

Figure 4:
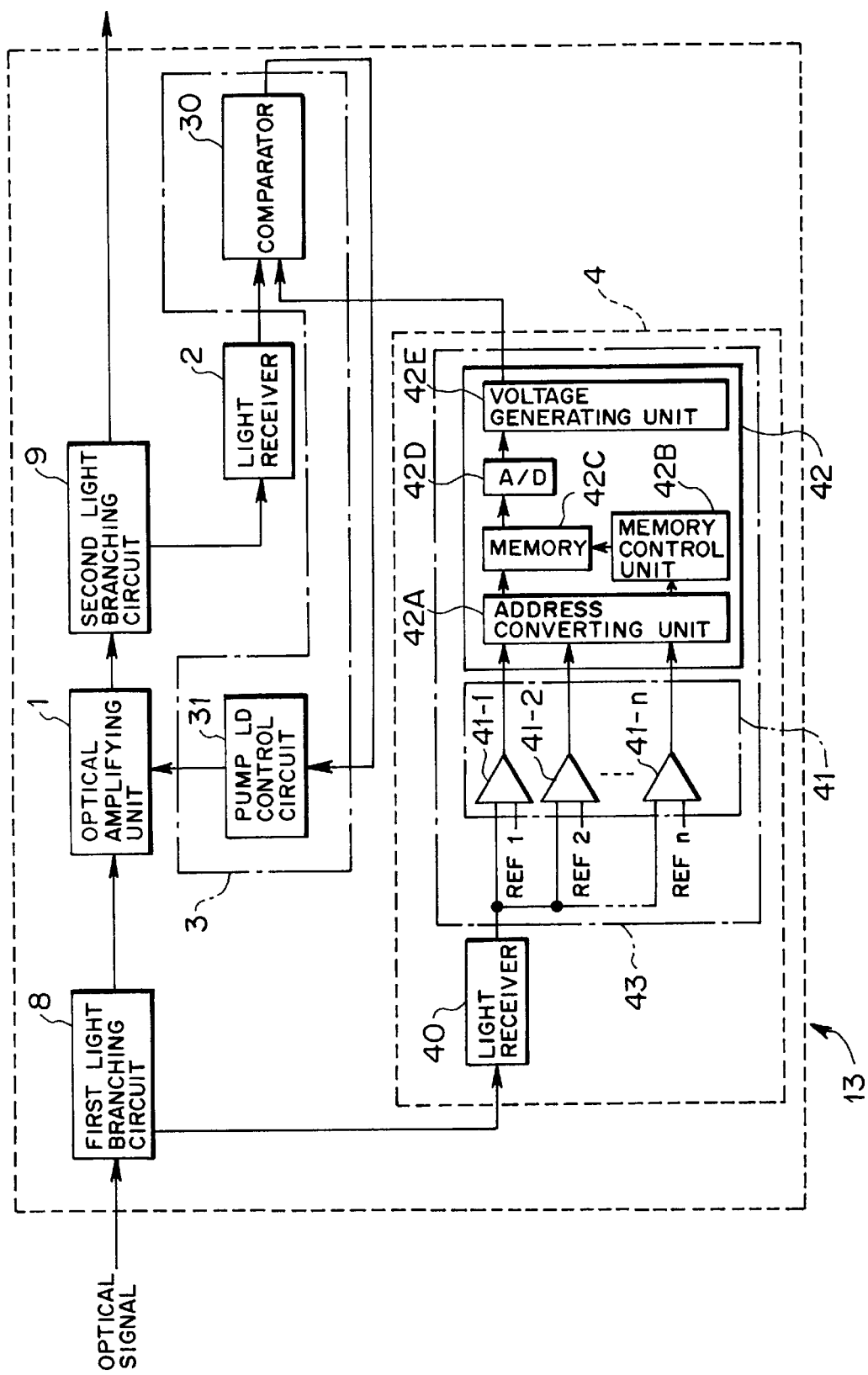
FIG. 4 is a block diagram showing a constitution of an optical amplifier of a first embodiment of the present invention.

Referring to FIG. 4 which is a block diagram showing the optical amplifier of the first embodiment of the present invention, an optical amplifier 13 shown comprises an optical amplifying unit 1, a light receiver (photo detector) 2, a control unit 3, a level detecting unit 4 and first and second light branching circuits 8 and 9.

The first light branching circuit 8 branches a portion of an optical signal which has been inputted. This circuit 8 includes, for instance an optical coupler. The optical amplifying unit 1 amplifies an optical signal which has been inputted. For this unit 1, a unit composed by combining, for instance an erbium doped optical fiber (EDF) with a pumping light source (LD; LASER DIODE) for supplying an exciting light to this EDF is used. The optical amplifying unit 1 is controlled by the later-described control unit 3.

The second light branching circuit 9 branches a portion of the optical signal from the optical amplifying unit 1. This circuit 9 also includes, for instance an optical coupler. The light receiver (light output monitoring unit) 2 monitors the light output of the optical amplifying unit 1. Specifically, the light receiver 2 converts an optical signal into an electric signal by using a receiving element.

The control unit 3 controls the optical amplifying unit 1 by comparing the light output of the optical amplifying unit 1 monitored by the light receiver 2 with a specified reference value so as to cause the light output of the optical amplifying unit 1 to take a predetermined output value. This control unit 3 includes a comparator 30 and a pumping light source control circuit 31.

The comparator 30 compares an electric signal outputted from the light receiver 2 with a specified reference value. Specifically, this comparator 3 uses an output from the later-described level detecting unit 4 as a reference value.

The pumping light source control circuit (PUMP LD CONTROL CIRCUIT) 31 controls a pumping light source (PUMP LD, not shown) incorporated in the optical amplifying unit 1 based on an output from the comparator 30. This circuit 31 performs feedback control so as to cause a difference between an output from the light receiver 2 and a specified reference value to be 0. In this way, output power for each wavelength can be maintained constant.

The light receiver 2 and the control unit 3 configure an optical amplifier control circuit and function to control the gain of the optical amplifying unit 1. When light transmission is to be cut off, the control unit 3 can temporarily stop controlling by detecting a signal to this effect.

The level detecting unit (input light level detecting unit) 4 detects the input light level of an optical signal which has been inputted. This unit 4 includes a light receiver 40, a comparator 41 and a level converting unit 42.

The light receiver (light receiving unit) 40 receives an optical signal which has been inputted. Specifically, the light receiver 40 converts an optical signal from the first light branching circuit 8 into an electric signal (electric level) by using a receiving element.

The comparator 41 compares a signal detected by the light receiver 40 with a preset auxiliary reference value according to a multiple signal number (the number of input wavelengths). The comparator 41 includes comparator circuits 41-1 to 41-n (n is a natural number) corresponding in number to the number of input wavelengths. By comparing a signal which has been inputted with a preset auxiliary reference value (REF-1 to REF-N; N is a natural number), the comparator 41 can detect the existence of a reduction in the number of wavelength multiplexed signals (the number of wavelengths). In other words, the comparator 41 can output control signals in stages according to the number of wavelengths.

The operation of the comparator 41 will be described below by taking the use of a 4-wave multiple signal as an example. It is assumed that a value is set for the auxiliary reference value (REF 1) of the comparator circuit 41-1 according to a signal indicating that the number of wavelengths is 1, a value is set for the auxiliary reference value (REF 2) of the comparator circuit 41-2 according to a signal indicating that the number of wavelengths is 2, a value is set for the auxiliary reference value (REF 3) of the comparator circuit 41-3 according to a signal indicating that the number of wavelengths is 3 and further, a value is set for the auxiliary reference value (REF 4) of the comparator circuit 41-4 according to a signal indicating the number of all wavelengths.

In this condition, for example, when the optical signals of all the wavelengths are inputted, "1" (H level) is outputted from the comparator circuit 41-4 to the level converter 42 of the subsequent stage (i.e., "0","0", "0" and "1"). When the signal of the wavelength number 1 is inputted, "1" is outputted from the comparator circuit 41-2 for the wavelength number 2 and "0" is outputted from each of the other comparator circuits 41-1, 41-3 and 41-4 (i.e., "0", "1", "0" and "0").

In other words, in this case, it can be understood that although the optical signals of two wavelengths have been inputted, the optical signals of three or four wavelengths have not been inputted.

The auxiliary reference value has a certain width (range) and an output value is changed when a level after photoelectric conversion in the light receiver 40 is within this certain range. For example, referring to FIG. 5 which illustrates a detecting level range for a 2-wave multiple signal, a detecting level range can be set to a section A shown in the drawing when a receiving level (registered value) is one wave ($\lambda$1). Accordingly, the number of wavelengths can be surely detected even when a fluctuation occurs in an input light.

Figure 5:
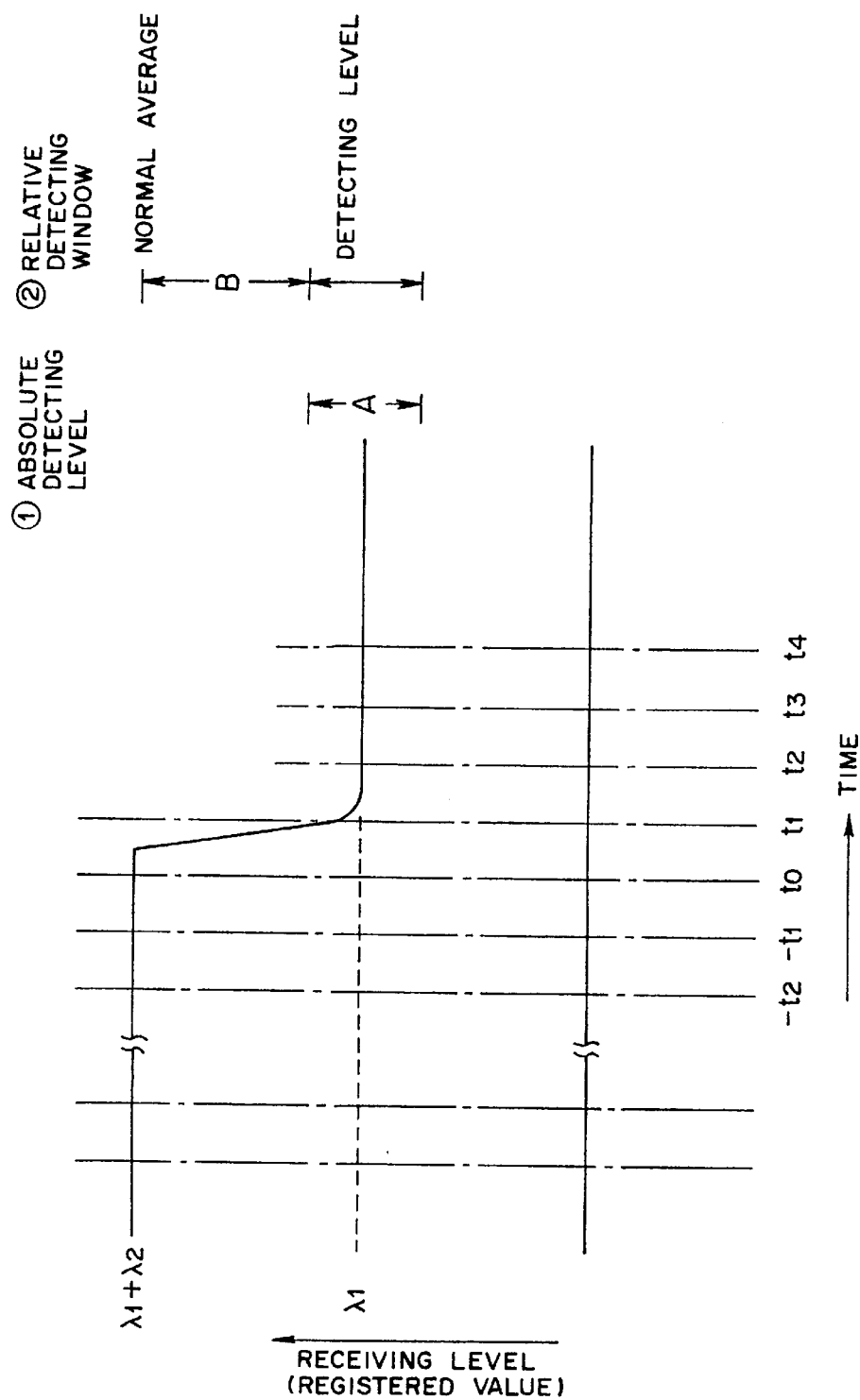
FIG. 5 is a view illustrating a detection level range for a 2-wave multiplexed signal of the first embodiment of the present invention.

In other words, during a normal period, the average value level of input signals ($\lambda$1+$\lambda$2) for the 2-wave multiple signal takes a range denoted by a section B shown in FIG. 5. Two waves ($\lambda$1+$\lambda$2) are detected when a received input signal is within the range denoted by the section B. One wave ($\lambda$1) is detected when a received input signal is within the range denoted by the section A.

The level converting unit 42 converts information compared by the comparator 41 into a reference value having a predetermined level. Its output is supplied to the comparator 30. Specifically, this level converting unit 42 includes an address converting unit 42A, a memory control unit 42B, a memory 42C, an analog/digital converting circuit (A/D) 42D and a voltage generating unit 42E.

The address converting unit 42A converts signals from the comparator circuits 41-1 to 41-n into addresses respectively. The memory 42C holds a content (REF value) for each wavelength. The analog/digital converting circuit 42D converts analog information from the memory 42C into digital information.

The memory control unit 42B reads the REF value of an address from the memory 42C based on information regarding the address from the address converting unit 42A. The voltage generating unit 42E outputs a reference voltage based on a digital signal obtained by conversion. The control unit 3 performs comparison for an input optical signal by using this reference voltage (reference value). An output inputted from the voltage generating unit 42E to the control unit 3 will be referred to as reference value change information, hereinafter.

The comparator 41 and the level converting unit 42 constitute a reference value change information supplying unit 43.

Circuit constants in the control unit 3 and the level detecting unit 4 are set in such a manner that the output light level of the optical amplifying unit 1 (optical amplifier 13) becomes constant at a predetermined value (P) during a normal period (no reduction occurs in the number of wavelengths) and the output light level of the optical amplifying unit 1 (optical amplifier 13) becomes P(N−M)/N (N; input wavelength number and M; reduced wavelength number) during an abnormal period (a reduction occurs in the number of wavelengths). Accordingly, even when a change occurs in the number of multiplexed wavelengths for an optical signal which has been inputted, a predetermined value can be outputted.

As described above, in the optical amplifier 13, the control unit 3 can control the light output level of the optical amplifying unit 1 by changing a reference value used for comparison according to the input light level detected by the level detecting unit 4.

In other words, a large correlation exists between this input light level (light quantity) and a multiple signal number and the reduced number of wavelengths (multiple signal number) can be detected from the size of a received light level. Accordingly, compared with the optical amplifier for directly detecting the number of wavelengths, output power per wave can be maintained constant during multiplexing without making a circuitry complex.

In the optical amplifier 13 of the first embodiment constructed in the above-noted manner, as shown in FIG. 4, after a wavelength multiplexed signal (optical signal) is inputted, the optical signal is branched into portions by the first light branching circuit 8. Then, the portion of the optical signal branched to the optical amplifying unit 1 side is amplified by the optical amplifying unit 1 and further branched by the second light branching circuit 9. Then, the portion of the optical signal branched to the light receiver 2 side by the second light branching circuit 9 is converted into an electric signal by the light receiver 2 and compared with a reference value change information by the comparator 30.

The reference value change information used for comparison is generated by the level detecting unit 4 based on another portion of the optical signal obtained by branching performed by the first light branching circuit 8. Specifically, in the level detecting unit 4, after the portion of the optical signal obtained by branching performed by the first light branching circuit 8 is inputted, the level of this optical signal is converted into an electric signal by the light receiver 40 and then compared with an auxiliary reference value set beforehand in each of the comparator circuits 41-1 to 41-n according to a multiple signal number. The result of this comparison is converted into a reference value having a predetermined level by the level converting unit 42 and then outputted. The output from the level detecting unit 4, which has been obtained as a result of the foregoing processing, is used as the above-noted reference value change information.

The comparator 30 compares the output from the light receiver 2 with the reference value having a predetermined level which is generated by the level detecting unit 4. Then, the comparator 30 controls the pumping light source of the optical amplifying unit 1 via the pumping light source control circuit 31 based on the result of this comparison. Accordingly, output power for the optical signal from the optical amplifier 13 is maintained constant.

With the optical amplifier 13 thus constructed, since the gain of the optical amplifying unit 1 can be controlled according to the input light level of an optical signal which has been inputted, compared with the amplifier for directly detecting the number of wavelengths, the number of multiplexed wavelengths can be easily detected without making a circuitry complex even when a change occurs in the number of multiplexed wavelengths.

Therefore, the optical amplifier can be simplified and the performance of the amplifier as a whole can be greatly improved. In addition, since the number of multiplexed wavelengths can be surely detected, output power for each wavelength can be maintained constant and highly reliable transmission quality is assured without any reductions in the quality of a light waveform.

According to the method for outputting the comparison result of the input light level in the comparator 41, "1" is outputted only from the comparator circuit (comparator circuit 41-2 corresponding to the wavelength number 2 in the above-described example) corresponding to the number of wavelengths (total number of wavelengths) which have been inputted. However, for instance if the comparator circuits are for the number of wavelengths which have been inputted, "1" may be outputted from all the comparator circuits.

In other words, in the above-described example (the signal of a wavelength number 2 has been inputted), "1" may be outputted from the comparator circuit 41-1 corresponding to the wavelength number 1 and the comparator circuit 41-2 corresponding to the wavelength number 2 and "0" may be outputted from the comparator circuits 41-3 and 41-4 (i.e., "1", "1", "0", and "0"). In this case, addresses in the address converting unit 42A of the subsequent stage can be set so as to be respectively converted into corresponding addresses as in the foregoing case.

(b1) Modified Example of the First Embodiment

Figure 6:
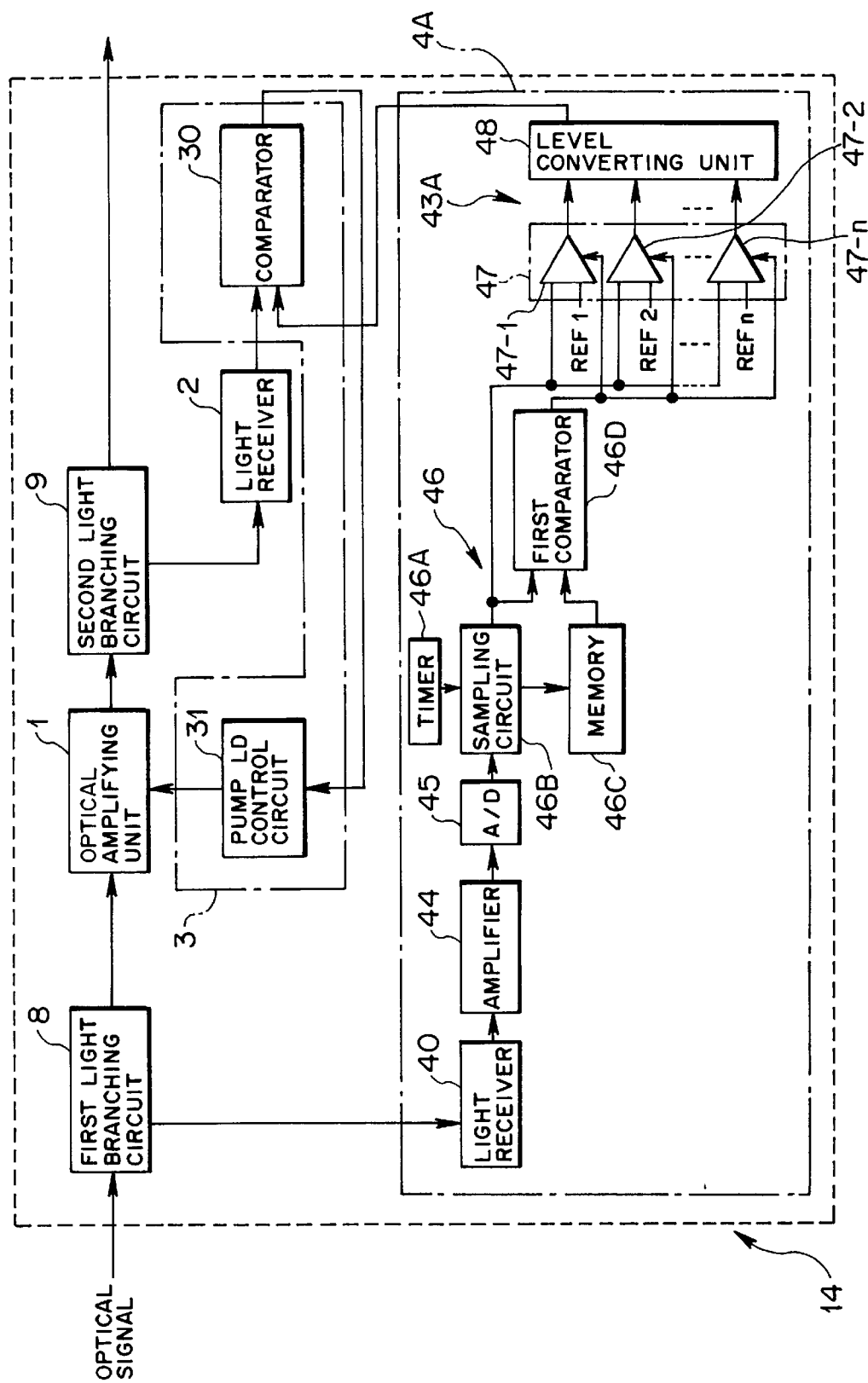
FIG. 6 is a block diagram showing a first modified example of the optical amplifier of the first embodiment of the present invention.

Referring to FIG. 6 which is a block diagram showing the modified example of the first embodiment of the present invention, an optical amplifier 14 shown comprises an optical amplifying unit 1, a light receiver 2, a control unit 3, a level detecting unit 4A and first and second light branching circuits 8 and 9. Codes similar to the foregoing codes denote like elements or almost like elements and thus, detailed description thereof will be omitted.

The level detecting unit (input light level detecting unit) 4A includes a light receiver 40, an amplifier 44, an analog/digital converting circuit 45, a timer 46A, a sampling circuit 46B, a memory 46C, first and second comparators 46D and 47 and a level converting unit 48. The light receiver (light receiving unit) 40 is similar or almost similar to the light receiver shown in FIG. 4 and thus, its detailed description will be omitted.

The amplifier 44 amplifies an electric signal obtained by photoelectric conversion performed by the light receiver 40. The analog/digital converting circuit (A/D) 45 converts an output (analog signal) from the amplifier 44 into a digital signal. The timer 46A outputs a specified sampling timing signal to the later-described sampling circuit 46B.

The sampling circuit 46B samples digital data from the analog/digital converting circuit 45 according to a predetermined sampling timing signal (time interval) from the timer 46A and outputs the sampled data to the later-described memory 46C and first and second comparators 46D and 47. The memory 46C holds (stores) data from the sampling circuit 46B and is constituted as, for instance a latch circuit.

The first comparator 46D compares current received light information from the sampling circuit 46B with past received light information stored in the memory 46C. If the result of comparison discovers that changes have occurred in these bits of received light information between the two points of time, in other words if a difference between the current and past multiple signal numbers is discovered, the first comparator 46D outputs a trigger signal to the second comparator 47. Thus, in the first comparator 46D, the quantity of a received light can be detected according to a timewise change.

The timer 46A, the sampling circuit 46B, the memory 46C and the first comparator 46D constitute a received light change information arithmetic unit 46. In this received light change information arithmetic unit 46, information regarding a change in the received light information between the two points of time as described above is calculated.

The second comparator 47 compares an output (received light information) from the sampling circuit 46B with a preset auxiliary reference value according to a multiple signal number. The second comparator 47 includes comparator circuits 47-1 to 47-n (n is a natural number) corresponding in number to the number of input wavelengths. Specifically, when a trigger signal from the first comparator 46D is received, the second comparator 47 compares the input signal with a preset auxiliary reference value (REF-1 to REF-N).

The level converting unit 48 converts the information compared by the second comparator 47 into a reference value having a predetermined level. Specifically, the unit 48 functions in a manner similar to that for the level converting unit 42 shown in FIG. 4. This output (reference value) is supplied as reference value change information to be used by the control unit 3. The second comparator 47 and the level converting unit 48 constitute a reference value change information supplying unit 43A.

Figure 8:
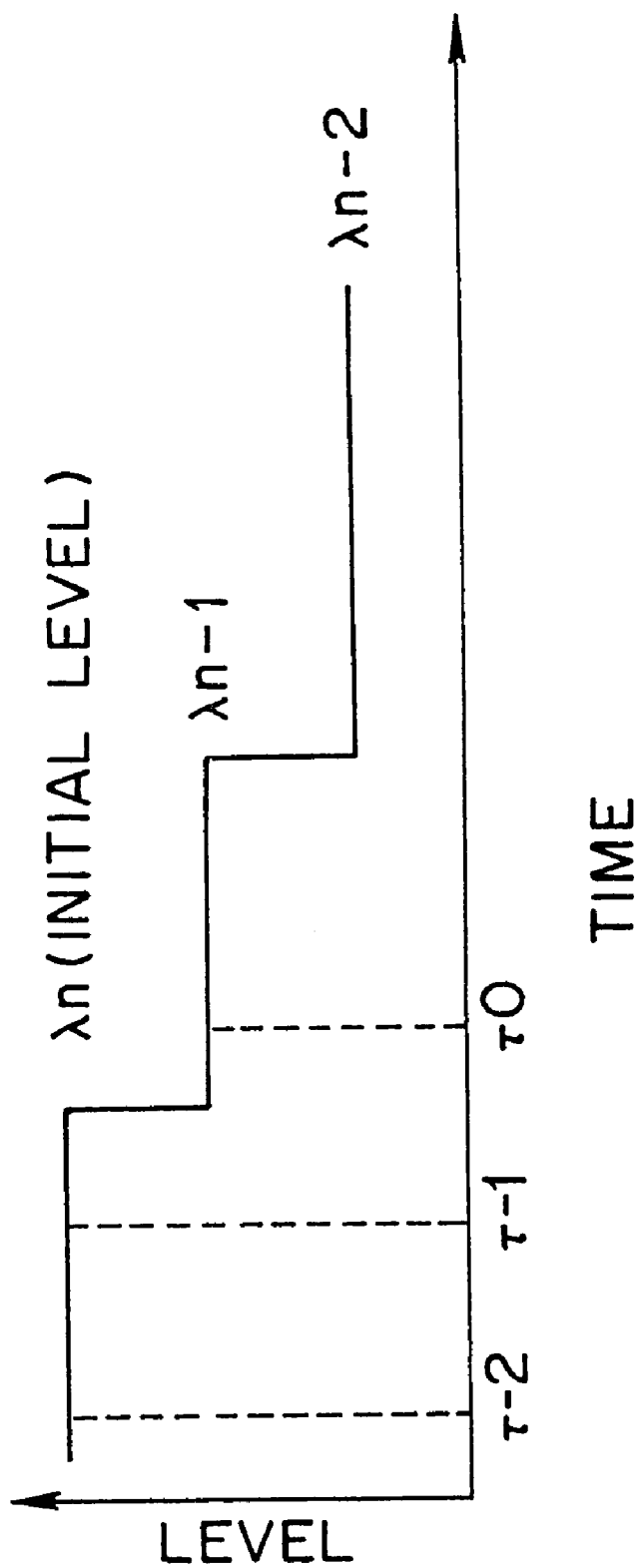
FIG. 8 is a view illustrating comparison performed in an input light level detecting unit of the first modified example of the first embodiment of the present invention.

Referring to FIG. 8 which illustrates comparison performed in the level detecting unit 4A of the modified example, if a current time is $\tau$-1 as shown, a past level stored in the memory 46C (received light quantity at a time $\tau$-2) is compared with a current level from the sampling circuit 46B

(received light quantity at a time of τ-1) in the first comparator 46D. In this case, since the received light levels are equal to each other (τn; initial level for both), no difference in comparing results is determined. Accordingly, no trigger signals are outputted from the first comparator 46D (second comparator 47 is OFF).

Thereafter, when a time becomes τ0, a past level stored in the memory 46C (τn; received light quantity at a time of τ-1) is compared with a current level from the sampling circuit 46B (λn-1; received light quantity at a time of τ0) in the first comparator 46D. In this case, since the received light levels are different from each other, a difference in comparing results is determined. Accordingly, a trigger signal is outputted from the first comparator 46D and then the second comparator 47 is started (second comparator 47 is ON).

Figure 7:
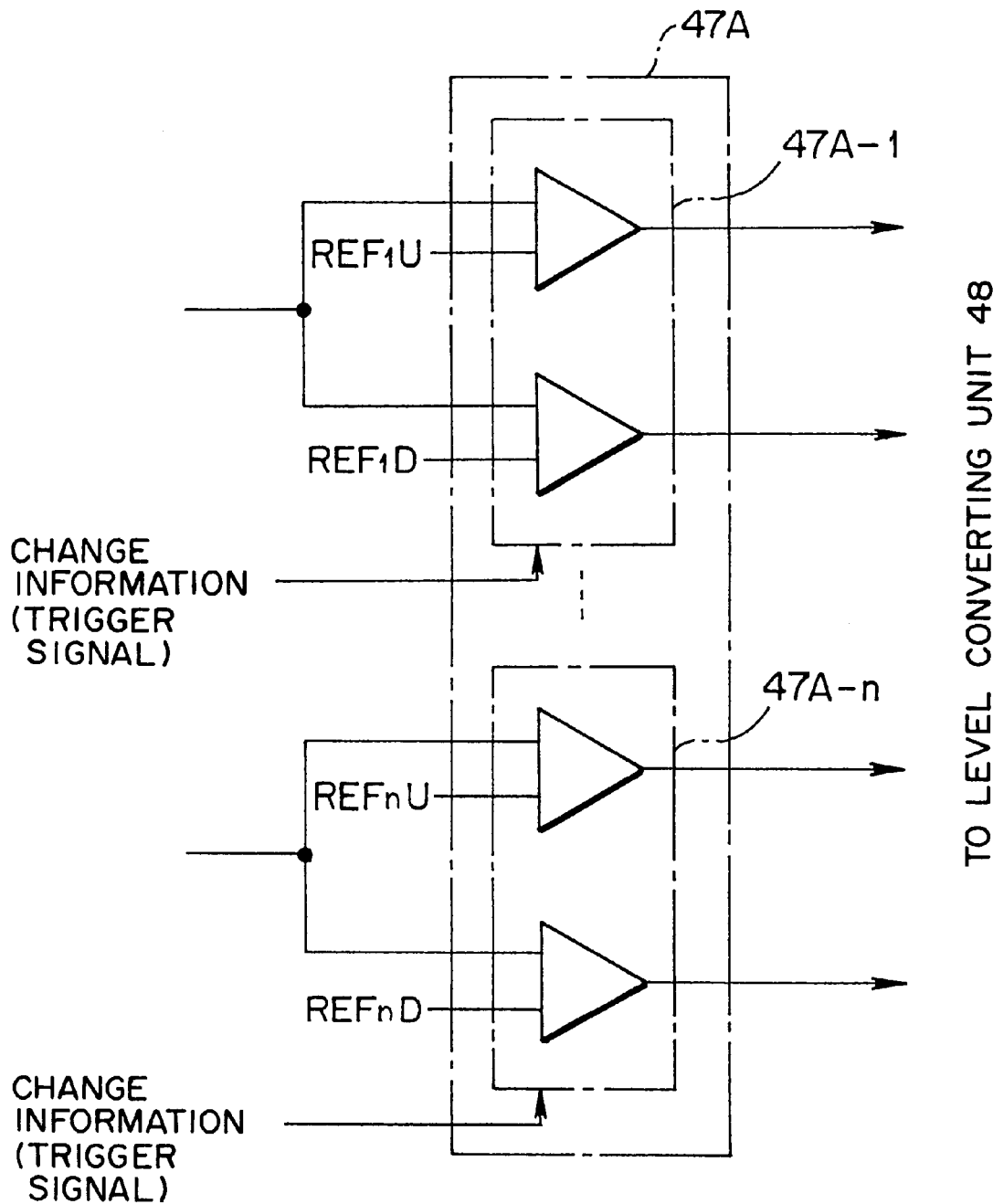
FIG. 7 is a block diagram showing a constitution of a window comparator of the first modified example of the first embodiment of the present invention.

The comparator circuits 47-1 to 47-n of the second comparator 47 shown in FIG. 6 are configured respectively as window comparators 47A-1 to 47A-n 20 like those shown in FIG. 7. In this case, two reference values ($REF_i$ U and $REF_i$ D; i is a natural number) are set in each of the window comparators 47A-1 to 47A-n. Accordingly, even when a fluctuation occurs in input received light information, such a fluctuation can be flexibly dealt with by preventing its influence on comparing and detecting operations.

Figure 9:
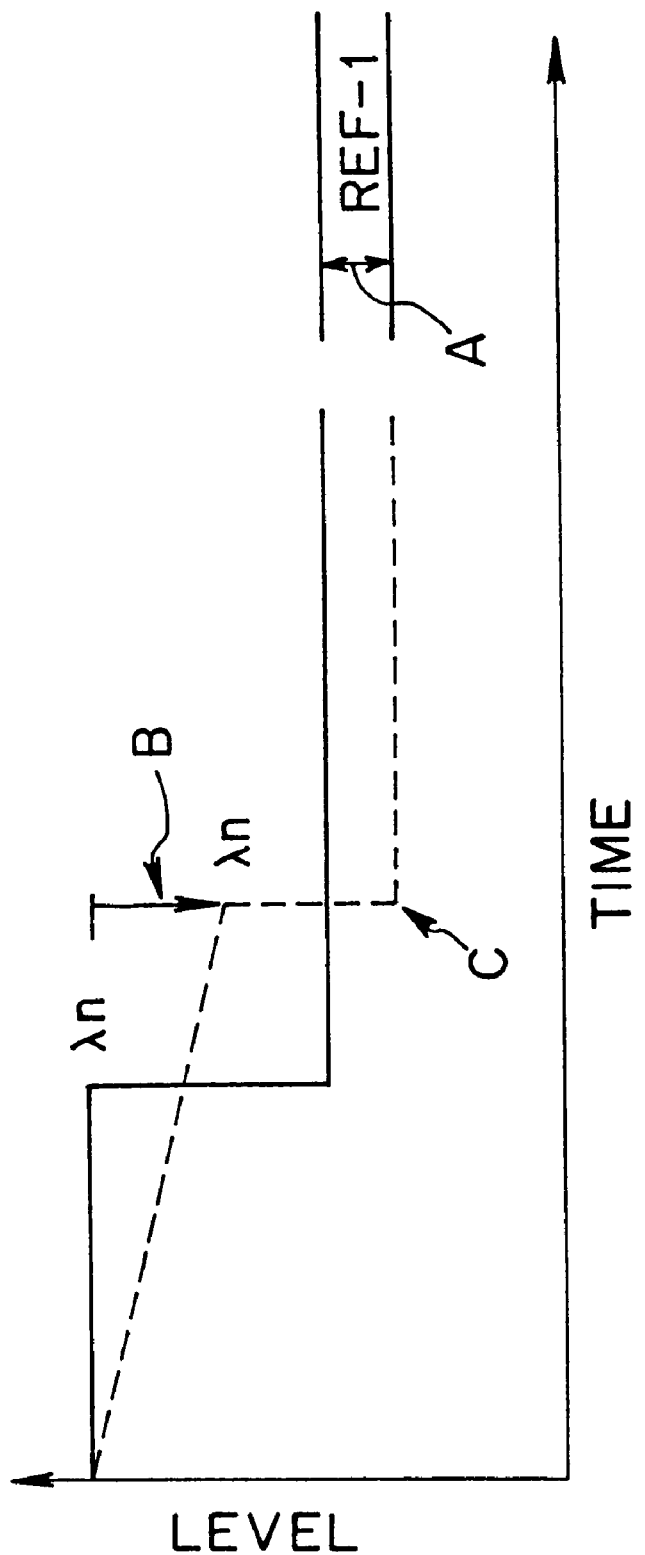
FIG. 9 is a view illustrating another example of comparison performed in the input light level detecting unit of the first modified example of the first embodiment of the present invention.

In other words, in this case, for example as shown in FIG. 9, since the level of an auxiliary reference value (reference level) in the second comparator 47 has a sufficient range (REF-1; see the arrow A of FIG. 9), a timewise change (see the arrow C of FIG. 9) caused by the deterioration of a received light quantity (λn) after the lapse of time (see the arrow B of FIG. 9) can be dealt with.

As described above, according to the modified example, information regarding received lights between two point of time, present and past, is sampled by the sampling circuit 46B for an optional period and when a change occurs in the information regarding the received lights between these two points of time, comparing with a specified auxiliary reference value is performed. Accordingly, the existence of a reduction in the number of wavelength multiplexed signals can be detected while considering a timewise change in a received light quantity.

With the optical amplifier 14 of the modified example constructed in the above-noted manner, as in the case of the optical amplifier 13 described above with reference to FIG. 4, after a wavelength multiplexed signal (optical signal) is inputted, a portion of the optical signal is branched by the first light branching circuit 8. Then, a portion of the optical signal branched to the optical amplifying unit 1 side is amplified by the optical amplifying unit 1 and further branched by the second light branching circuit 9. Thereafter, the portion of the optical signal branched to the light receiver 2 side by the second light branching circuit 9 is converted into an electric signal by the light receiver 2 and compared with reference value change information by the comparator 30.

The reference value change information used for the above-described processing is generated by the level detecting unit 4A based on another portion of the optical signal obtained by branching performed by the first light branching circuit 8 in a manner below. In the level detecting unit 4A, after a portion of an optical signal obtained by branching performed by the first light branching circuit 8 is inputted, this portion is converted into an electric signal by the light receiver 40, amplified by the amplifier 44 and then converted into a digital signal by the analog/digital converting circuit 45. Then, this digital signal is sampled by the sampling circuit 46B based on a timing from the timer 46A and outputted to the memory 46C and the first comparator 46D.

Thereafter, in the first comparator 46D, current received light information from the sampling circuit 46B is compared with past received light information stored in the memory 46C. If the result of this comparison shows that a change has occurred in the received light information between these two points of time, a trigger signal is outputted to the second comparator 47. On the other hand, if the result of the comparison shows no change between the current received light information and the past received light information, no trigger signals are outputted.

Then, upon having received the trigger signal from the first comparator 46D, the second comparator 47 compares the received light information from the sampling circuit 46B with an auxiliary reference value. The result of this comparison is then converted into a reference value having a predetermined level by the level converting unit 48 and outputted. The output from the level detecting unit 4A which has been obtained through the above-described processing is used as the reference value change information.

Thereafter, in the comparator 30, the output from the light receiver 2 is compared with the reference value change information generated by the level detecting unit 4A. The pumping light source of the optical amplifying unit 1 is then controlled by the pumping light source control circuit 31 based on the result of this comparison. Accordingly, the level of output power for the optical signal from the optical amplifier 14 is maintained constant.

With the optical amplifier 14 of the modified example, since the constitution of the amplifier is simplified as in the case of the first embodiment and the gain of the optical amplifying unit 1 is controlled when a change occurs in received light information between the two points of time, efficient comparison can be performed without being affected by a fluctuation in a received light quantity after the lapse of time. Accordingly, the performance of the optical amplifier can be improved and power consumption can be reduced.

(c) Second Embodiment of the Invention

Figure 10:
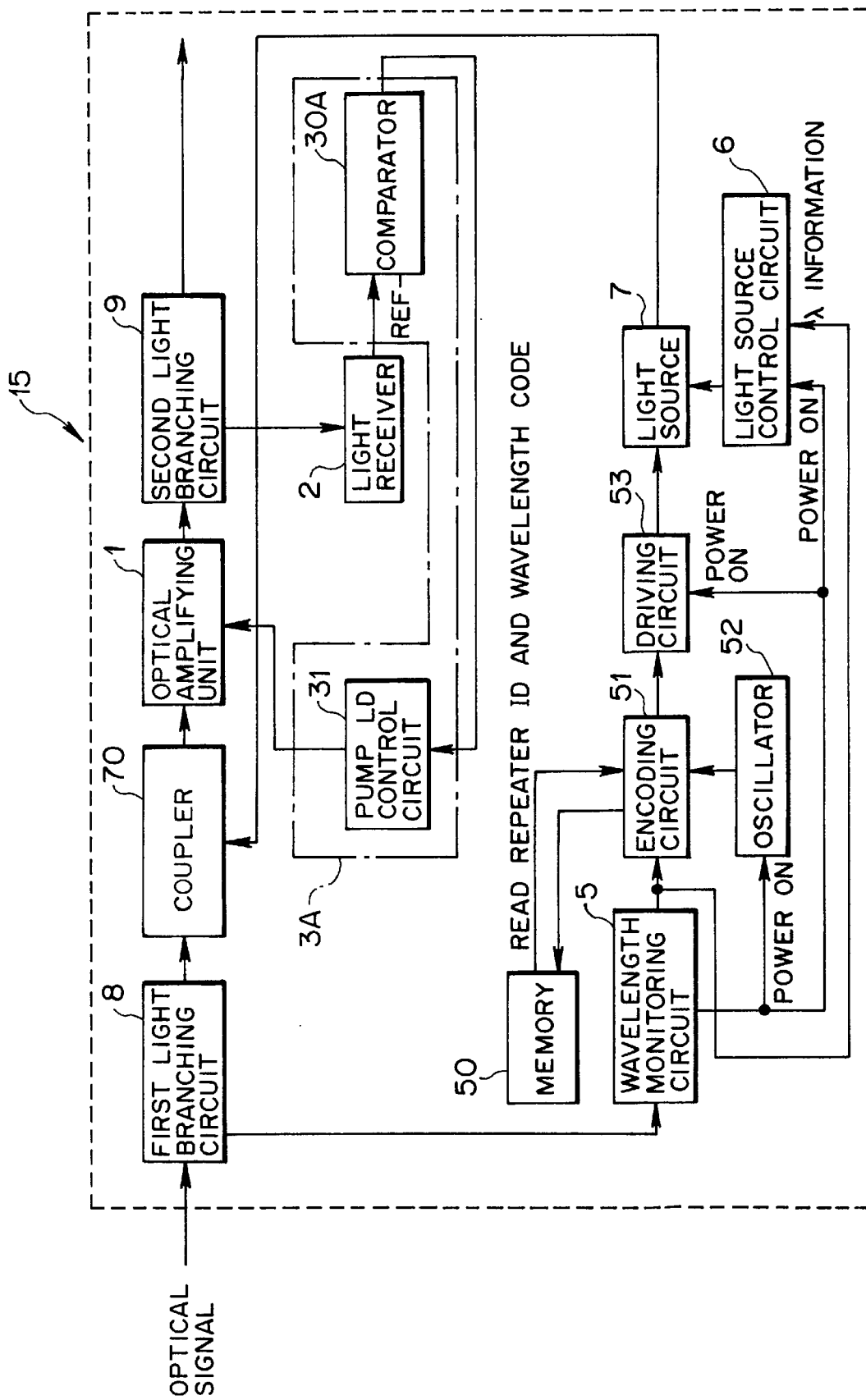
FIG. 10 is a block diagram showing a constitution of an optical amplifier of a second embodiment of the present invention.

Referring to FIG. 10 which is a block diagram showing the constitution of the optical amplifier of the second embodiment of the present invention, an optical amplifier 15 shown comprises an optical amplifying unit 1, a light receiver 2, a control unit 3A, a wavelength monitoring circuit 5, a light source control circuit 6, a light source 7, first and second light branching circuits 8 and 9, a memory 50, an encoding circuit 51, an oscillator 52, a driving circuit 53 and a coupler 70. Codes similar to the codes described above denote like elements or almost like elements and thus, detailed description thereof will be omitted.

The control unit 3A controls the optical amplifying unit 1 by comparing the light output of the optical amplifying unit 1 monitored by the light receiver 2 with a specified reference value so as to cause the light output of the optical amplifying unit 1 to take a predetermined output value. The control unit 3A includes a comparator 30A and a pumping light source control circuit (PUMP LD CONTROL CIRCUIT) 31.

The comparator 30A compares an electric signal outputted from the light receiver 2 with a specified reference value. Different from the first embodiment, this specified value is used as a fixed value. For the pumping light source control circuit 31, a circuit similar or almost similar to that in the first embodiment is shown and thus, its detailed description will be omitted. Also, as in the case of the first embodiment, during cutting off of light transmission, this control unit 3A can detect a signal to this effect and temporarily stop its control operation.

Figure 11:
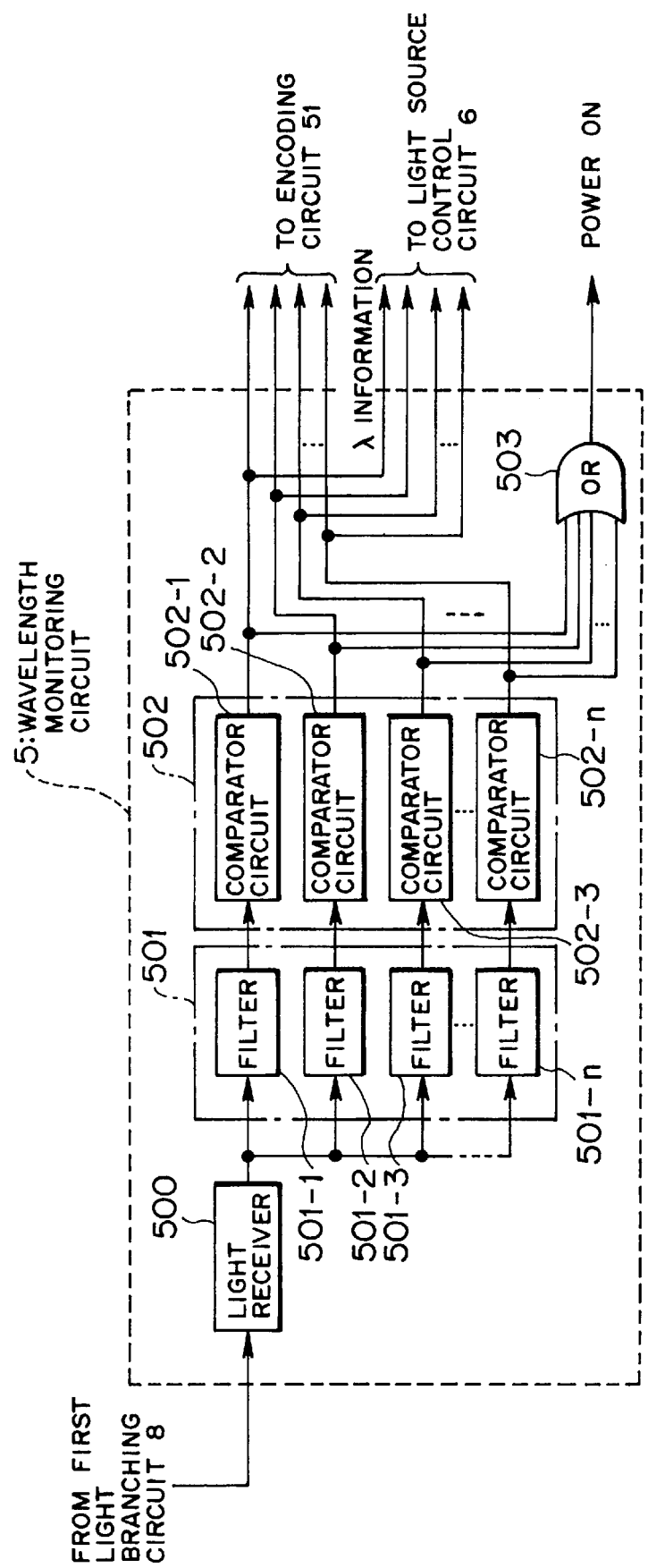
FIG. 11 is a block diagram showing an internal constitution of a multiple signal number detecting unit of the second embodiment of the present invention.

The wavelength monitoring circuit (multiple signal number detecting unit) 5 detects multiple signal number information for an optical signal which has been inputted. As shown in FIG. 11, this monitoring circuit 5 includes a light receiver 500, a filter unit 501, a comparator 502 and a logic circuit 503.

The light receiver (light receiving unit) 500 receives an optical signal which has been inputted. The filter unit 501 detects multiple signal number information from information regarding a received light detected by the light receiver 500. Specifically, the filter unit 501 includes a plurality of band-pass filters 501-1 to 501-n (n is a natural number) for a plurality of wavelengths. Superimposed signal components (e.g., f1 to f4 from oscillators 84-1 to 84-4 described later with reference to FIG. 25) are selectively outputted.

Figure 25:
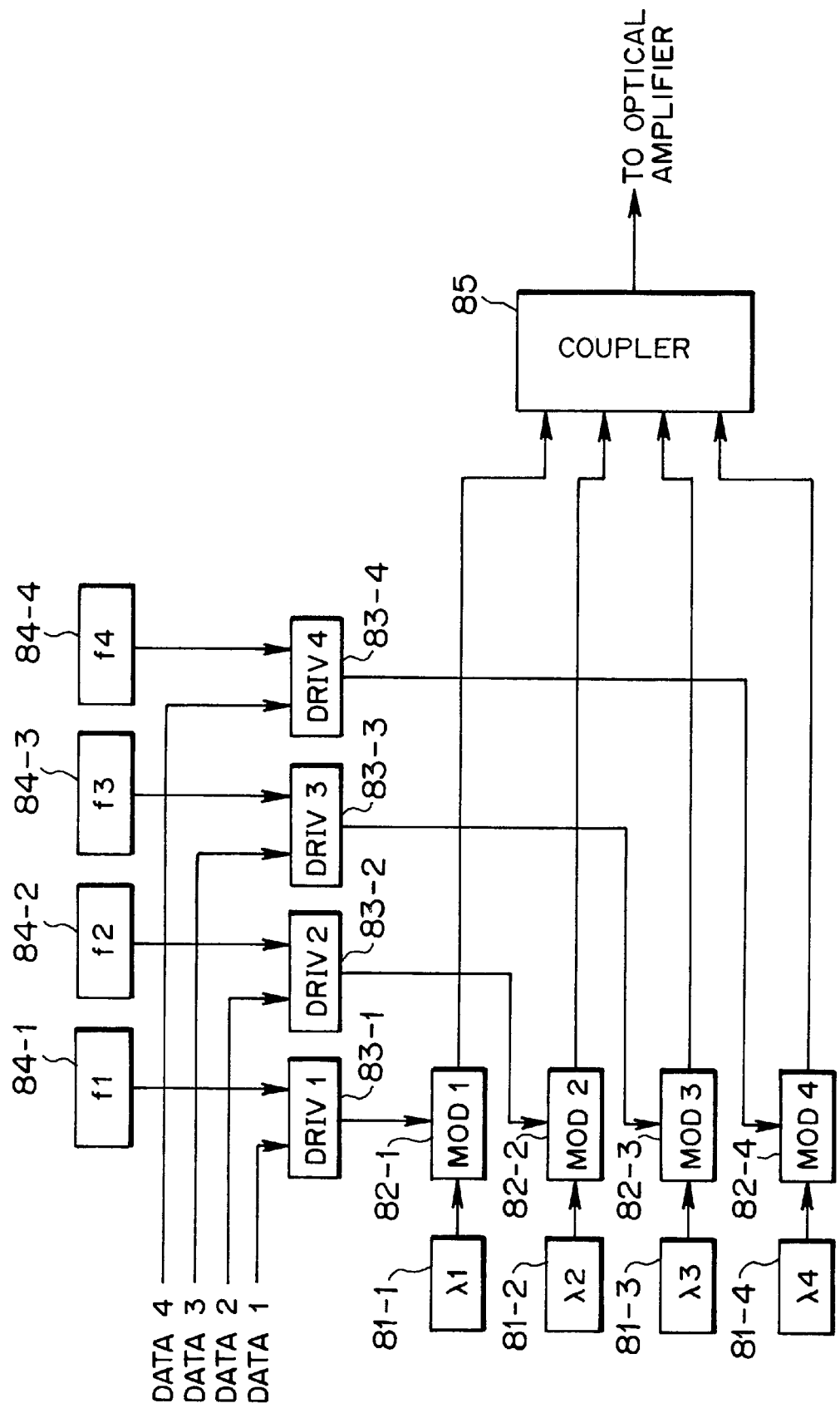
FIG. 25 is a block diagram showing an example of a 4-wave multiplex transmitting unit of a terminal station in an optical transmission system of the second embodiment of the present invention.
Figure 27:
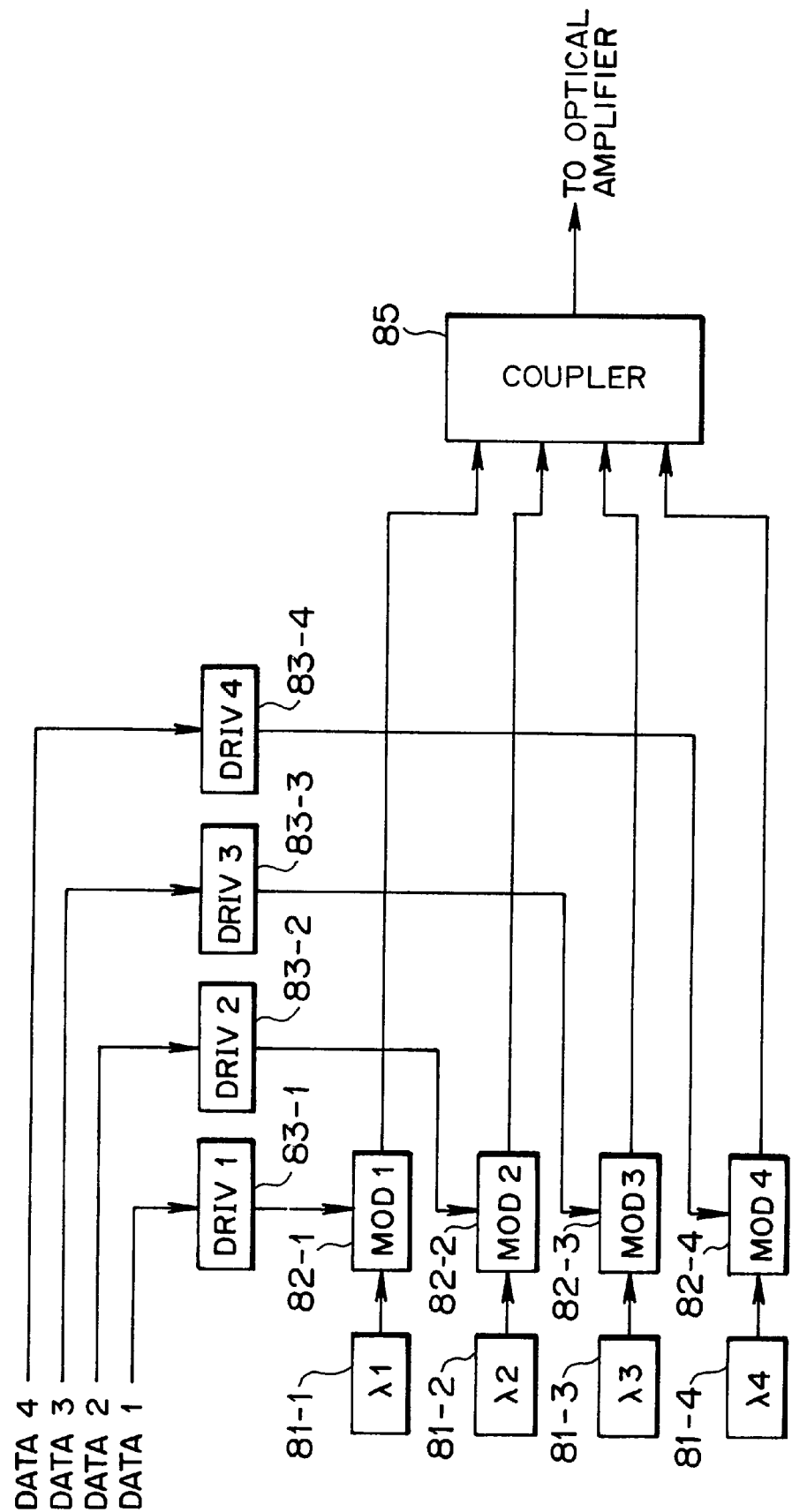
FIG. 27 is a block diagram showing an example of a 4-wave multiplex transmitting unit of a terminal station in the typical optical transmission system.
Figure 28:
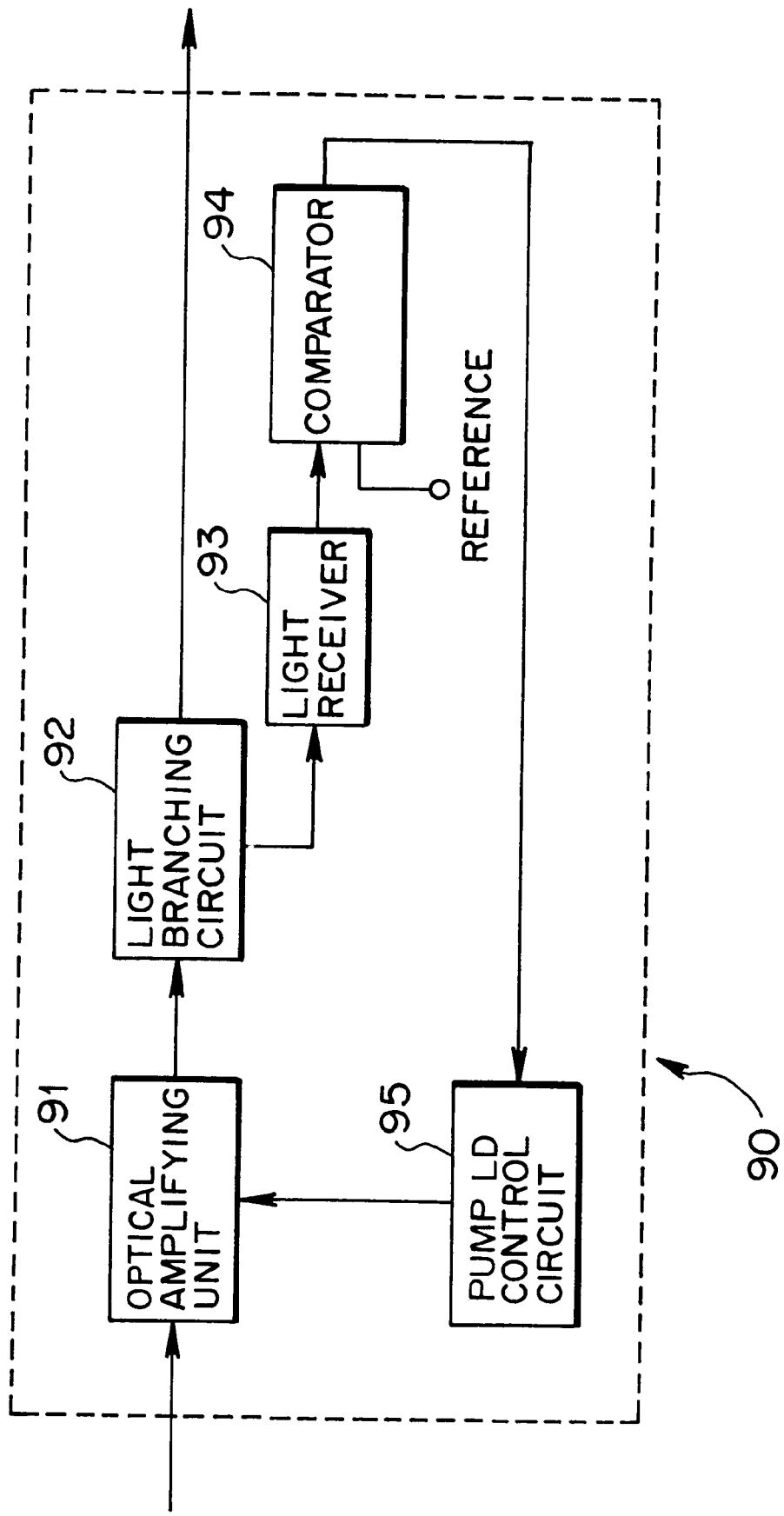
FIG. 28 is a block diagram showing a constitution of a typical optical amplifier.

In other words, when the filter unit 501 is installed in the optical amplifier 13 as the receiving side of the optical transmission system, for example as shown in FIG. 25, the oscillators 84-1 to 84-4 are installed in the transmitting side of a corresponding terminal station. The optical transmission system shown in FIG. 25 is for illustration of an example of a 4-wave multiplex transmitting unit. Codes similar to the codes described above denote like elements or almost like elements (see FIG. 27) and thus, detailed description thereof will be omitted.

Specifically, the 4-wave multiplex transmitting unit shown in FIG. 25 superimposes frequencies (f1 to f4) on main signals (DATA 1 to DATA 4) by the oscillators 84-1 to 84-4 for optical signals having wavelengths ($\lambda$1 to $\lambda$4). These modulated optical signals are multiplexed by a coupler 85 and then outputted to an optical amplifier.

The comparator 502 shown in FIG. 11 compares an output from the filter unit 501 with a specified referenced value. In order to deal with a plurality of wavelengths, the comparator 502 includes a plurality of comparator circuits 502-1 to 502-n (n is a natural number). In each of the comparator circuits 502-1 to 502-n, a multiple signal which has been inputted is compared with each reference value and the existence of the wavelength component of the signal which has been inputted is detected. In other words, an output (wavelength information) from the comparator 502 corresponds to the number of wavelengths which have reached the optical amplifier 15.

Specifically, in the comparator 502, if the result of comparison shows no difference between the multiple signal which has been inputted and each reference value (no reduction has occurred in the number of wavelengths), "0" (L level) is outputted. On the other hand, if the result of comparison shows the existence of a difference (a reduction has occurred in the number of wavelengths), "1" (H level) is outputted.

The operation of the comparator 502 will now be described by taking the use of a 4-wave multiple signal as an example. It is assumed that a specified reference value for the comparator circuit 502-1 is set to a value according to the signal of a wavelength $\lambda$1, a specified reference value for the comparator circuit 502-2 is set to a value according to the signal of a wavelength $\lambda$2, a specified reference value for the comparator circuit 502-3 is set to a value according to the signal of a wavelength $\lambda$3 and a specified reference value for the comparator circuit 502-4 is set to a value according to the signal of a wavelength $\lambda$4.

In this condition, when the optical signals of all the wavelengths are inputted, "0" is outputted from all of the comparator circuits 502-1 to 502-4. When the signals of the wavelengths $\lambda$1 and $\lambda$2 are inputted, "1" is outputted from the comparator circuits 502-3 and 502-4 for the wavelengths $\lambda$3 and $\lambda$4 to which no inputs have been made (i.e., "0", "0", "1" and "1").

The result of comparison performed by the comparator 502 is outputted as wavelength information ($\lambda$ information) to the later-described encoding circuit 51 and the light source control circuit 6. The result of comparison is also outputted as information used for determining the existence of wavelengths to the later-described logic circuit 503.

The logic circuit (OR) 503 performs an ORing operation for an output from the comparator 502. Specifically, the logic circuit 503 includes an OR circuit and outputs "1" (H level) when "1" is outputted from any one of the comparator circuits 502-1 to 502-n. In other words, the logic circuit 503 can detect the existence of wavelengths which have not been inputted (sometimes referred to as non-input wavelengths, hereinafter).

An output signal from the logic circuit 503 is used, as described later, to control the actuation of each of the oscillator 52, the driving circuit 53 and the light source control circuit 6 (controlling of power ON/OFF).

The memory 50 stores information regarding all the wavelengths of a multiple signal number having a plurality of wavelengths which have been inputted and the identification number of a repeater (repeater ID) in which the optical amplifier 15 is incorporated. The memory 50 outputs information requested by the later-described encoding circuit 51.

The encoding circuit 51 encodes wavelength information outputted from the wavelength monitoring circuit 5. The encoding circuit 51 optionally reads the repeater ID of the optical amplifier 15 and wavelength information (wavelength code) appropriate for a non-input wavelength from the memory 50. The encoding circuit 51 performs encoding based on a signal from the later-described oscillator 52.

The oscillator 52 decides a transmission speed for encoding performed by the encoding circuit 51. The oscillator 52 outputs a timing signal to the encoding circuit 51 based on power ON information from the wavelength monitoring circuit 5. The driving circuit (modulation circuit) 53 modulates the later-described light source 7. This driving circuit 53 is also actuated based on power ON information from the wavelength monitoring circuit 5.

The light source control circuit (light source control unit) 6 controls the light source 7 (this light source 7 includes a plurality of light sources as described later) according to multiple signal number information detected by the wavelength monitoring circuit 5 so as to cause the light source to output a compensating optical signal, which in turn causes the light output level of the optical amplifying unit 1 to take a specified level. The light source control circuit 6 selects and actuates a light source appropriate for an optical signal having a wavelength which has not been inputted.

This light source control circuit 6 is also actuated based on power ON information from the wavelength monitoring circuit 5. In other words, the oscillator 52, the driving circuit 53 and the light source control circuit 6 are actuated by receiving power ON information from the wavelength monitoring circuit 5 only when wavelengths which have not been inputted are detected.

After the light source 7 has been actuated, actuation and control by the light source control circuit 6 are performed based on a temperature and a current.

The light source (compensating optical signal generation light source) 7 supplies a compensating optical signal to the input side of the optical amplifying unit 1. Specifically, as shown in FIG. 8, the light source 7 includes a plurality of light sources 7-1 to 7-n (n is a natural number) for producing optical signals having wavelengths $\lambda$1 to $\lambda$n so as to deal with a plurality of wavelengths (all the wavelengths λ1 to λn used in the transmission system). When a reduction occurs in a wavelength number for signals which have been inputted, the light source 7 supplies compensating optical signals from the light sources 7-1 to 7-n for outputting optical signals having wavelengths equivalent in number to the reduced wavelength number to the input side of the optical amplifying unit 1.

In other words, the light sources 7-1 to 7-n output optical signals having the same wavelengths as the wavelengths (non-input wavelengths) determined to be unoperated by the wavelength monitoring circuit 5. In the compensating optical signal, the bits of information (control information) obtained by the wavelength monitoring circuit 5, the memory 50 and the encoding circuit 51 are superimposed on one another.

Figure 18:
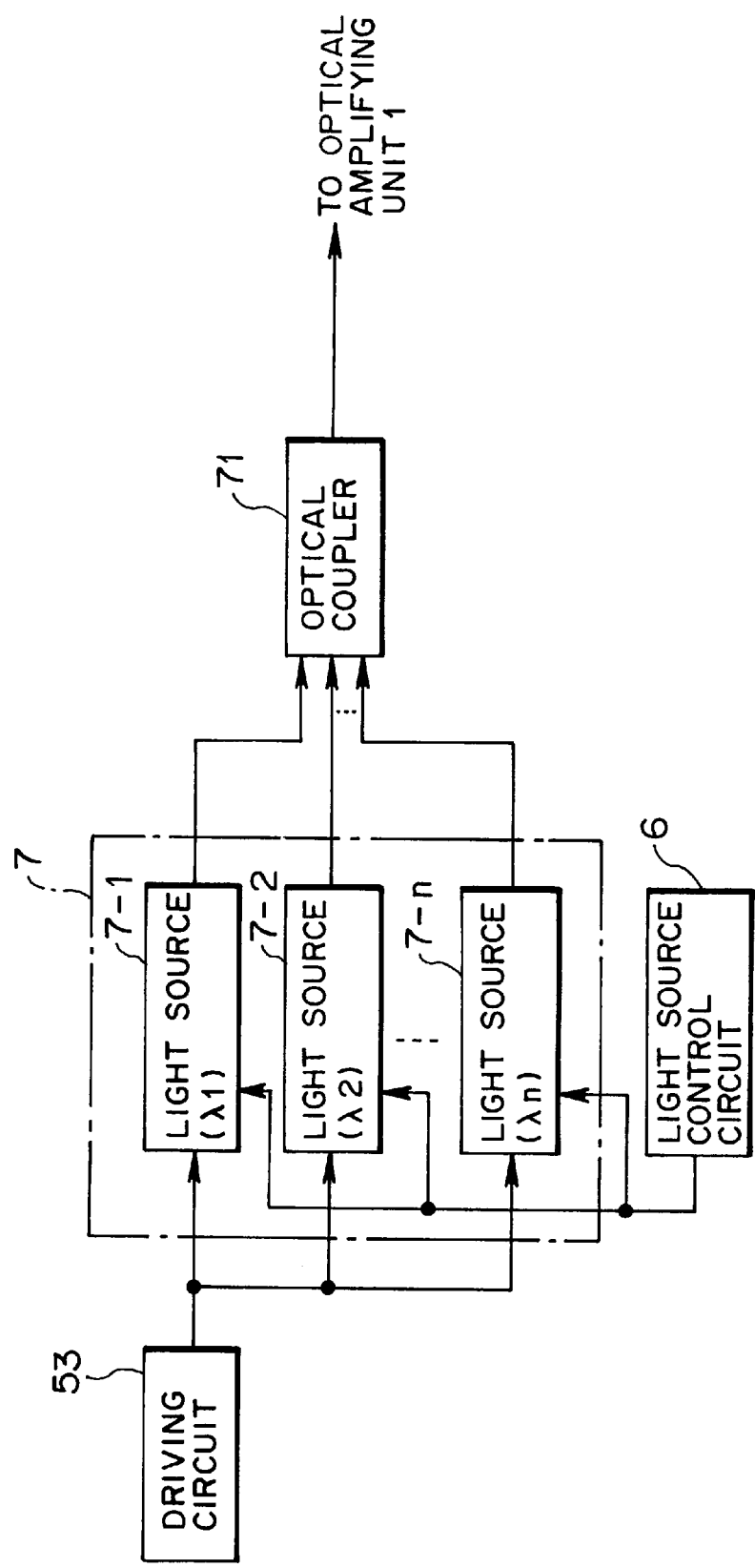
FIG. 18 is a block diagram showing a light source and its surrounding portion of the second embodiment of the present invention.

A code 71 shown in FIG. 18 denotes an optical coupler. Optical signals from the light sources 7-1 to 7-n are multiplexed by this optical coupler 71. An output from the optical coupler 71 is supplied to the input side of the optical amplifying unit 1 (to the coupler 70 provided in a stage before the optical amplifying unit 1 in the case of FIG. 10).

The coupler 70 synthesizes a compensating optical signal from the light source 7 with an input optical signal from the first light branching circuit 8. Specifically, a portion of the input optical signal from the first light branching circuit 8, whose wavelength number has been reduced, is compensated for by a compensating optical signal from the light source 7.

Accordingly, since a constant light quantity is always outputted from the coupler 70, the light output level of the optical amplifying unit 1 can be maintained at a specified level. In FIG. 10, the optical signal from the light source 7 is inputted to the coupler 70 located in the stage before the optical amplifying unit 1. But any position of the input side of the optical amplifying unit 1 can be selected for this purpose.

Figure 26:
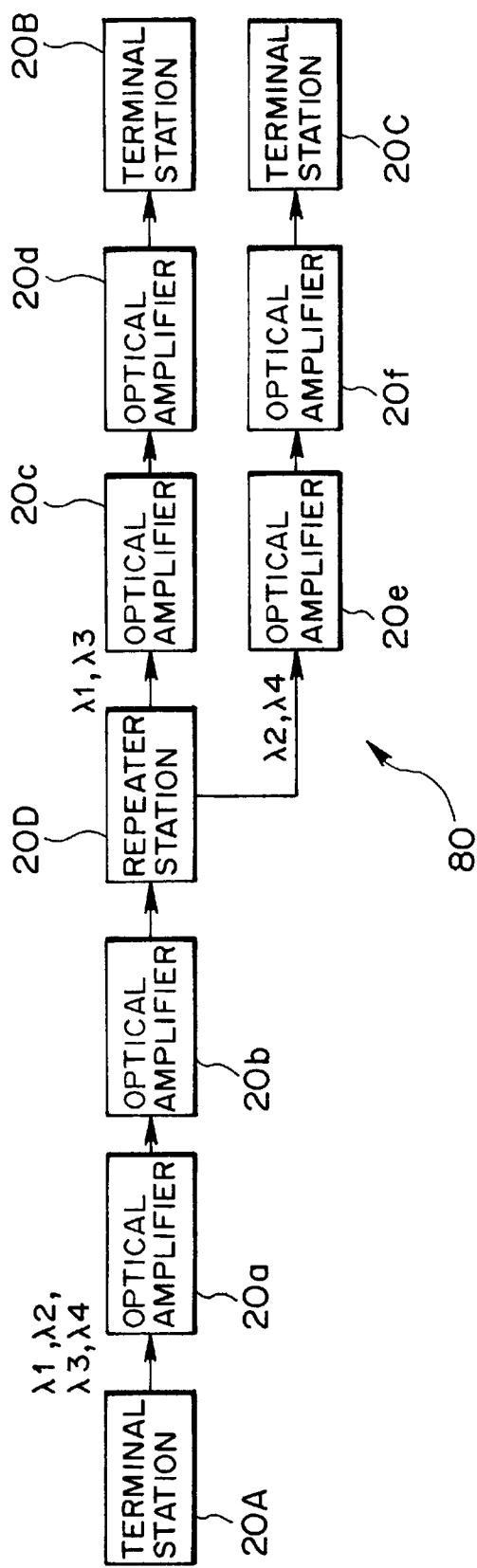
FIG. 26 is a block diagram showing a typical optical transmission system.

In the optical amplifier 15, since the multiple signal number of an optical signal which has been inputted is monitored and a compensating optical signal like that described above is outputted based on the information regarding the multiple signal number, the condition (non-input wavelength number) of the repeater station (repeater station 20D in the case of FIG. 26) can be understood from control information regarding the compensating optical signal which has been outputted in each of the terminal stations 20A to 20C (see FIG. 26).

With the optical amplifier 15 of the second embodiment constructed in the above-noted manner, as shown in FIG. 10, after a wavelength multiplexed signal (optical signal) is inputted, a portion of this optical signal is branched by the first light branching circuit 8. The portion of the optical signal branched to the wavelength monitoring circuit 5 side is converted into an electric signal by the light receiver 500 as in the case of the first embodiment described above with reference to FIG. 11. Then, signal components are selectively outputted by the filter unit 501 and respectively compared with set reference values by the comparator 502. Each of the result of this comparison is outputted as wavelength information to the encoding circuit 51 and the light source control circuit 6 and as information for determining the existence of wavelengths to the logic circuit 503.

Now, the operations of the wavelength monitoring circuit 5 and its surrounding units when a reduction occurs in the number of wavelengths will be described. For example, if the optical signal of a wavelength λ2 is not inputted, in the wavelength monitoring circuit 5, "1" is outputted from the comparator circuit 502-2 while "0" is outputted from each of the other comparator circuits 502-1 and 502-3 to 502-n. These outputs are then transmitted to the encoding circuit 51, the light source control circuit 6 and the logic circuit 503 in the subsequent stages.

From the logic circuit 503, power ON information is outputted to the oscillator 52, the driving circuit 53 and the light source control circuit 6 based on the output from the comparator 502-1. The encoding circuit 51 then reads the repeater ID of the optical amplifier 15 and wavelength information (wavelength code) appropriate for the wavelength λ2 from the memory 50 based on a timing signal from the oscillator 52 and encodes the repeater ID and the wavelength information. The light source control circuit 6 causes the light source 7-2 to output an optical signal appropriate for the wavelength λ2 based on a driving operation performed by the driving circuit 53.

Thereafter, the compensating optical signal outputted from the light source 7-2 is synthesized with an input optical signal from the first light branching circuit 8 by the coupler 70. In the optical amplifying unit 1, this synthesized optical signal is subjected to gain control based on a control signal processed by the light receiver 2 and the control unit 3 and then outputted as a specified optical signal.

With the optical amplifier 15 constructed in the above-noted manner, since a compensating optical signal is supplied to the input side of the optical amplifying unit 1 according to the multiple signal number of an optical signal which has been inputted, output power for each wavelength can be controlled to a constant level without changing the circuitry of the feedback control system of the existing optical amplifying unit 1.

(c1) Modified Example of the Wavelength Monitoring Circuit 5 of the Second Embodiment In the optical amplifier 15 of the second embodiment, the wavelength monitoring circuit 5 is used as means for detecting multiple signal number information for an optical signal which has been inputted. However, as means (mode) for detecting such multiple signal number information, for instance the following three means [modified examples (A) to (C)] can be used instead.

(A) First Modified Example of the Wavelength Monitoring Circuit 5

Figure 12:
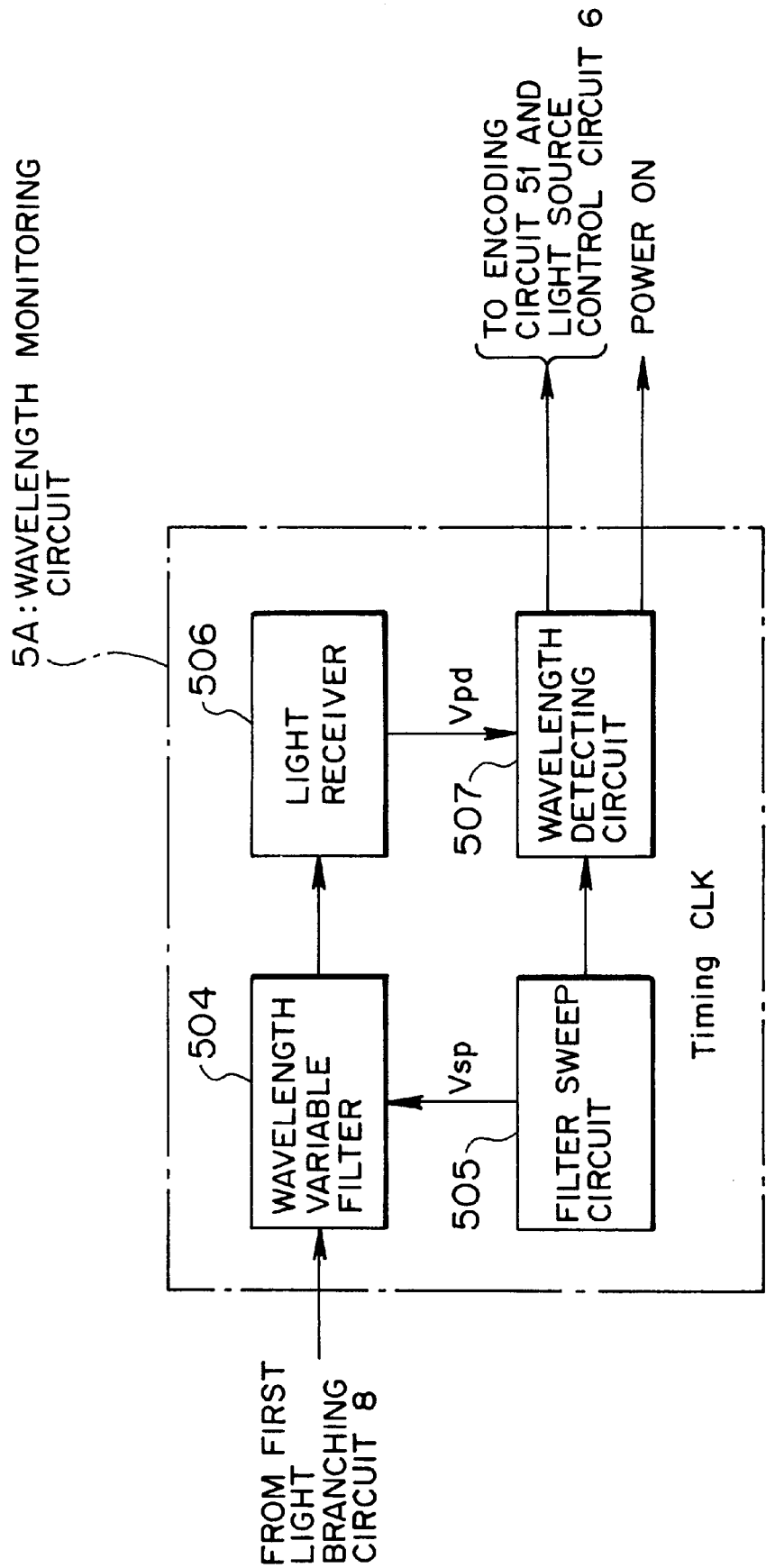
FIG. 12 is a block diagram showing a constitution of a first modified example of the multiple signal number detecting unit of the second embodiment of the present invention.

In the detailed description of the second embodiment, reference was made to the wavelength monitoring circuit 5 in which the filter unit 501 included the plurality of filters so as to deal with the plurality of wavelengths. However, for example, as shown in FIG. 12, a wavelength monitoring circuit 5A having a wavelength variable filter 504 for making a filter wavelength variable can be used for the present invention. In this case, the wavelength monitoring circuit 5A includes, in addition to the wavelength variable filter 504, a filter sweep circuit 505, a light receiver 506 and a wavelength detecting circuit 507.

The filter sweep circuit 505 sweeps the filter wavelength of the wavelength variable filter 504 in a fixed cycle. Upon receiving a predetermined signal (filter sweep voltage; Vsp) corresponding to the filter wavelength of the wavelength variable filter 504, the filter sweep circuit 505 decides the filter wavelength of the wavelength variable filter 504.

Figure 14:
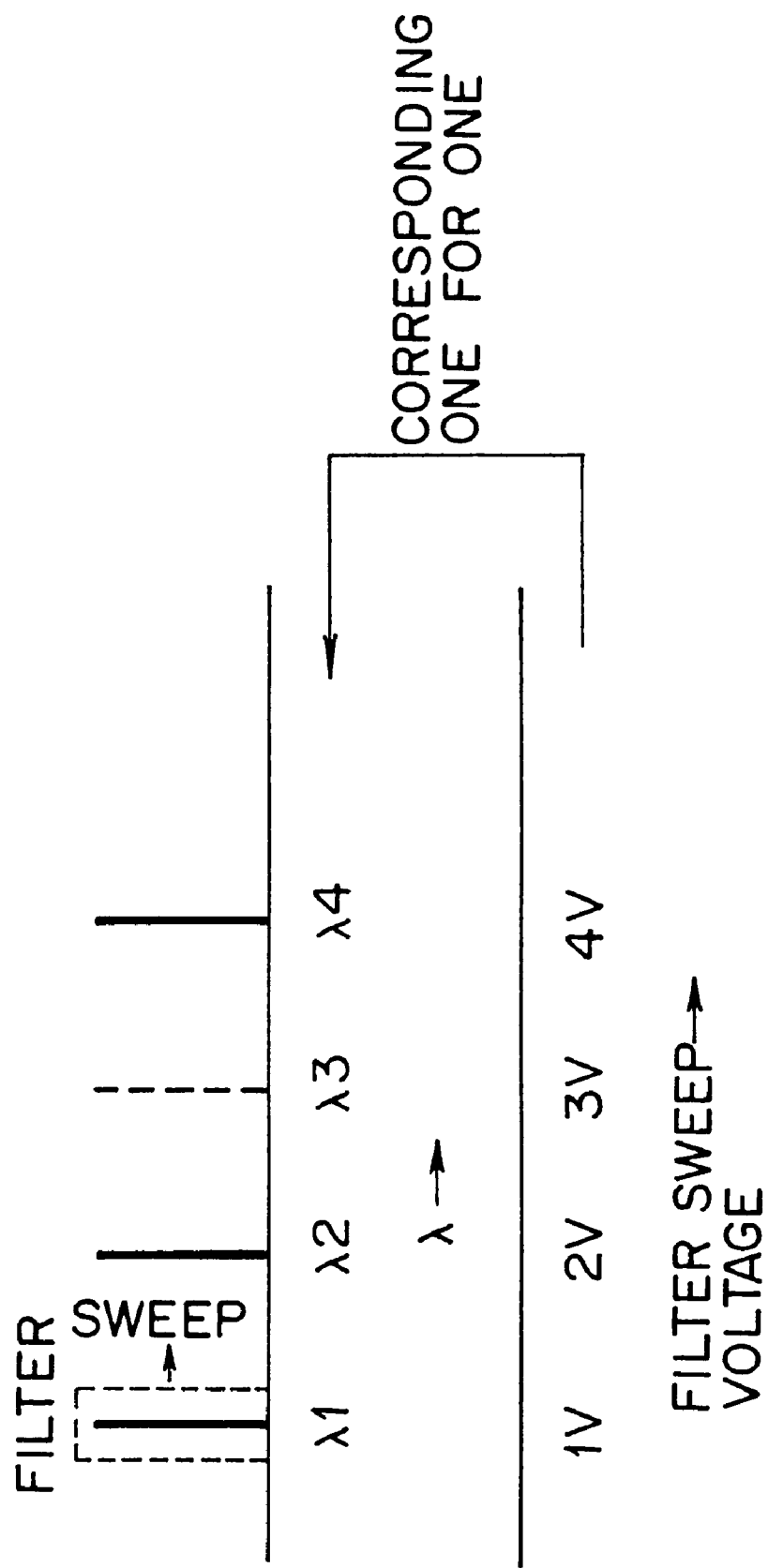
FIG. 14 is a block diagram showing an example of a filter sweep voltage of a filter sweep circuit of the multiple signal number detecting unit shown in FIG. 12.

Specifically, the filter sweep voltages and the filter wavelengths of the wavelength variable filter 504 correspond to one another one for one as shown in FIG. 14. For example, when a filter sweep voltage is 1V, a wavelength is set so as to allow the signal of a wavelength λ1 to be passed. When a voltage is 2V, a wavelength is set so as to allow the signal of a wavelength λ2 to be passed.

The filter sweep circuit 505 may perform sweeping in a step form (e.g., when the wavelengths λ1 to λ4 are used, the filter for the wavelength λ5 or over is not selected) and alternatively in a linear form (i.e., the circuit 505 sweeps all the wavelengths in sequence) so as to select only the wavelengths to be actually used. Further, this filter sweep circuit 505 outputs a timing for performing sweeping as a timing signal (Timing CLK) to the later-described wavelength detecting circuit 507 [timing signal; see FIG. 15(*a*)].

The light receiver 506 receives an optical signal which has been inputted via the wavelength variable filter 504 and converts this optical signal into an electric signal. The output (Vpd) of the light receiver 506 is supplied to the later-described wavelength detecting circuit 507.

Figure 13:
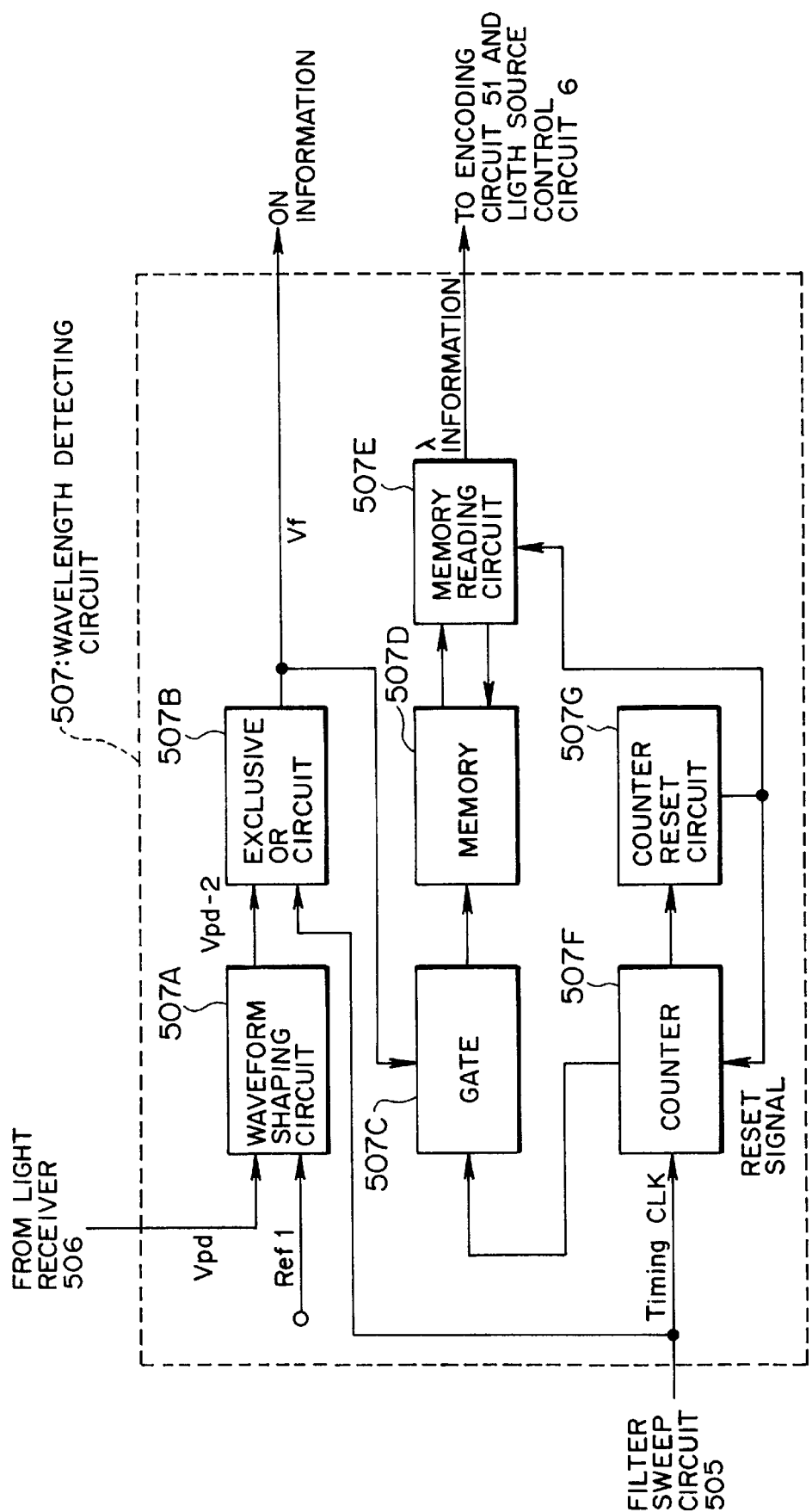
FIG. 13 is a block diagram showing an internal configuration of a wavelength detecting circuit of the multiple signal number detecting unit shown in FIG. 12.

The wavelength detecting circuit 507 detects the wavelengths which have not been inputted based on the timing signal from the filer sweep circuit 505 and the output from the light receiver 506. For example, as shown in FIG. 13, the wavelength detecting circuit 507 includes a waveform shaping circuit 507A, an exclusive OR circuit 507B, a gate circuit (GATE) 507C, a memory 507D, a memory reading circuit 507E, a counter 507F and a counter reset circuit 507G.

Figure 15:
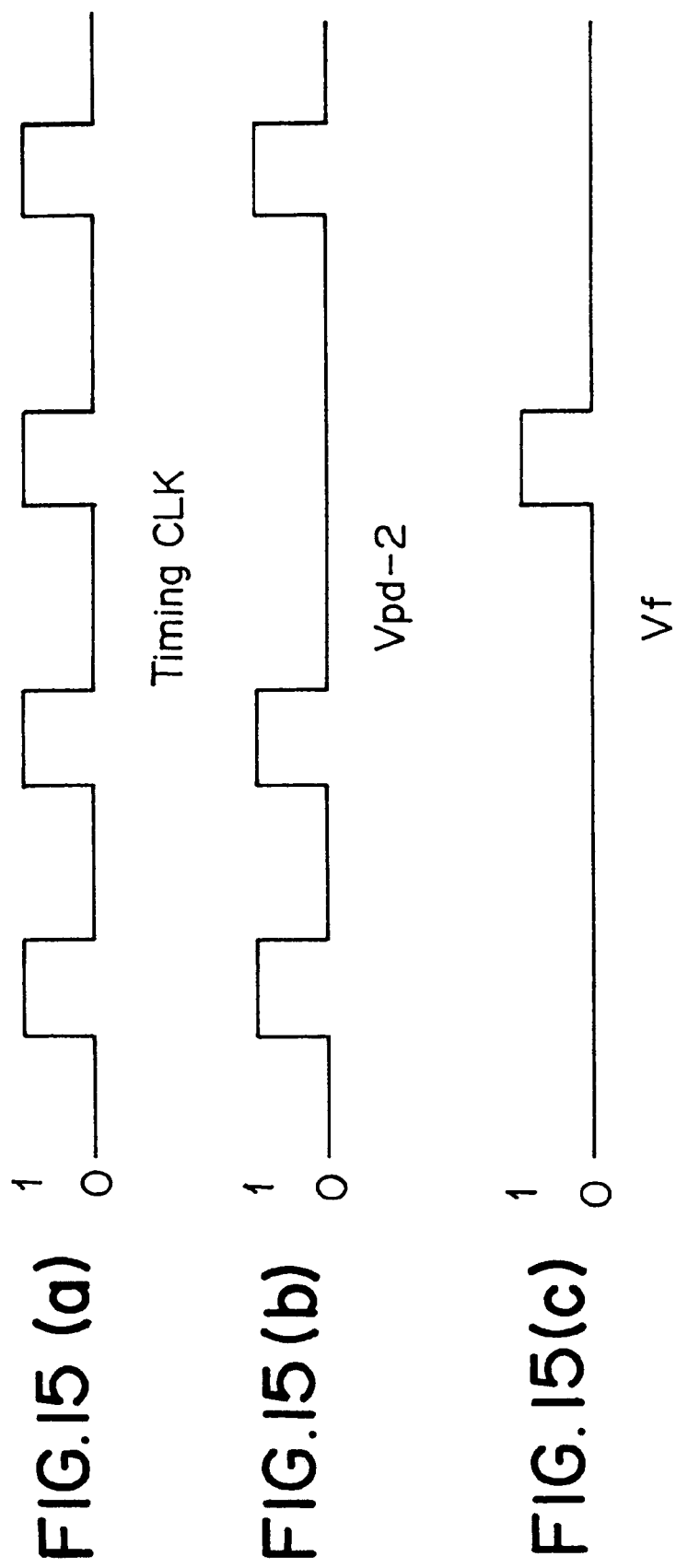

The waveform shaping circuit 507A shapes the waveform of a signal which has been inputted from the light receiver 506 to a rectangular wave [voltage Vpd-2; see FIG. 15(*b*)]. The waveform is shaped based on a specified reference value (Ref 1). In other words, when the signal which has been inputted exceeds this reference value, "1" (H level) is outputted. When the signal does not exceed the reference value, "0" (L level) is outputted. In FIG. 15, the total wavelength number of a multiple signal which has been inputted is shown to be "4" (λ1 to λ4). In this case, it can be understood that the signal of the wavelength λ3 has not been inputted.

The exclusive OR circuit (EXOR) 507B performs exclusive ORing for the output from the comparator 502 and the timing signal from the filter sweep circuit 505. A bit becomes a state of "1" (i.e., "1" is outputted) for the wavelength which has not been inputted (omitted wavelength) [voltage Vf; see FIG. 15(*c*)]. Also, during this period, ON information is simultaneously outputted to the oscillator 52, the driving circuit 53 and the light source control circuit 6 in the subsequent stage.

The counter 507F outputs a count value based on the timing signal from the filter sweep circuit 505. For example, when the total wavelength number of a multiple signal which has been inputted is 4, count values of "1 to 4" are outputted to the later-described gate circuit 507C and the counter reset circuit 507G. In other words, "1" is outputted for the wavelength λ1 and "2" is outputted for the wavelength λ2.

The counter reset circuit 507G outputs a reset signal ("0") when a count number is satisfied. For example, when the total multiplex number of a signal which has been inputted is "4", after counting is made up to "4", the counter reset circuit 507G resets the counter 507F and the later-described memory reading circuit 507E.

The gate circuit 507C outputs "1" (opens the gate) based on a count value from the counter 507F when "1" is outputted from the exclusive OR circuit 507B. For example, when the signal of the wavelength λ3 contained in a 4-wave multiplexed signal is not inputted, with a count value from the counter 507F set to "3", a signal ("1") based on the wavelength λ3 which has not been inputted is outputted to the memory 507D. ON information outputted from the exclusive OR circuit 507B may be outputted from this gate circuit 507C.

The memory 507D stores the signal outputted from the gate circuit 507C. The memory reading circuit 507E reads information stored in the memory 507D by using a reset signal from the counter reset circuit 507G as a trigger signal. The information read by the memory reading circuit 507E is outputted as λ information to the encoding circuit 51 and the light source control circuit 6.

Thus, in the wavelength monitoring circuit 5A shown in FIG. 12, after an optical signal is inputted from the first light branching circuit 8, this optical signal is passed through the wavelength variable filter 504 and then subjected to photoelectric conversion by the light receiver 506 and then, in the wavelength detecting circuit 507, detection of a wavelength which has not been inputted like that described above with reference to FIG. 13 is performed based on an electric signal from the light receiver 506 and a timing signal from the filter sweep circuit 505.

The specific process will be described below by taking as an example non-inputting of the wavelength λ3 contained in a multiple signal having a total wavelength number of "4". Upon receiving an output (Vpd) from the light receiver 506, the wavelength detecting circuit 507 first shapes the output to a rectangular wave by the waveform shaping circuit 507A [see FIG. 15(*b*)]. Then, the wavelength detecting circuit 507 performs exclusive ORing for this rectangular wave and a timing clock outputted from the filter sweep circuit 505 [see FIG. 15(*a*)] by the exclusive OR circuit 507B and thereby outputs a bit for the omitted wavelength [Vf; see FIG. 15(*c*)].

On the other hand, counting is made by the counter 507F based on the timing clock from the filter sweep circuit 505. In the gate circuit 507C, the gate is opened according to this counting when an output (Vf) from the exclusive OR circuit 507B is "1". A count value obtained at this time is stored in the memory 507D. In this case, a count number 3 is recorded.

Then, the counter reset circuit 507G resets the counter 507F to "0" when a count number from the counter 507F is 4 and sends a reset signal to the memory reading circuit 507E. The memory reading circuit 507E then performs reading from the memory by using this reset signal as a trigger signal. This information is outputted as λ information to the encoding circuit 51 and the light source control circuit 6.

With the wavelength monitoring circuit 5A configured in the above-noted manner, since an omitted wavelength can be detected by using the wavelength variable filter 504 which can make a filter wavelength variable, a circuitry can be reduced in size. Accordingly, the optical amplifier can be greatly reduced in weight.

(B) Second Modified Example of the Wavelength Monitoring Circuit 5

Figure 16:
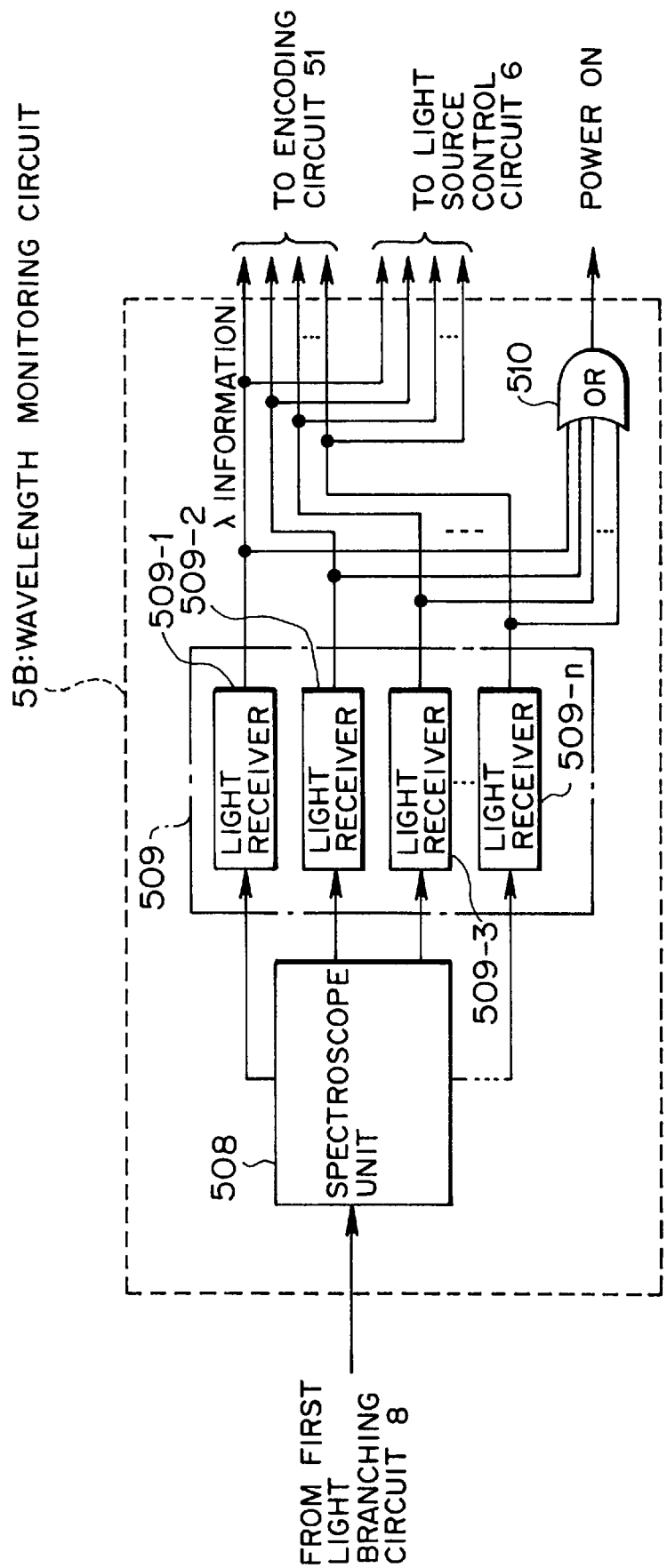
FIG. 16 is a block diagram showing a constitution of a second modified example of the multiple signal number detecting unit of the second embodiment of the present invention.

In the second embodiment and the first modified example (A), the wavelength monitoring circuit 5 and 5A having filters were described. However, for example, as shown in FIG. 16, a wavelength monitoring circuit 5B having a plurality of light receivers 509-1 to 509-n so as to deal with a plurality of wavelengths can be used for the present invention. In this case, the wavelength monitoring circuit 5B includes a spectroscope unit (spectrometer) 508, a light receiver 509 and a logic circuit 510.

The spectroscope unit 508 divides an optical signal which has been inputted into some lights by considering its wavelengths. The light receiver 509 individually receives the lights obtained by division performed by the spectroscope unit 508. In each of the plurality of light receivers 509-1 to 509-n provided so as to deal with a plurality of wavelengths λ1 to λn, the optical signal is converted into an electric signal by using a light receiving element.

An output from each of the light receivers 509-1 to 509-n is outputted as wavelength information (λ information) to the encoding circuit 51 and the light source control circuit 6 as in the case shown in FIGS. 11 and 12. This output is also supplied to the later-described logic circuit 510 as information used for determining the existence of wavelengths.

The logic circuit 510 performs an ORing operation for the output from the light receiver 509. As in the case of the logic circuit 503 (see FIG. 11), this logic circuit 510 can detect the existence of wavelengths which have not been inputted.

With the wavelength monitoring circuit 5B configured in the above-noted manner, since optical signals which have been inputted can be individually received, wavelength information can be surely detected. Accordingly, degree of flexibility can be greatly increased when a system is constituted for the optical amplifier.

(C) Third Modified Example of the Wavelength Monitoring Circuit 5

Figure 17:
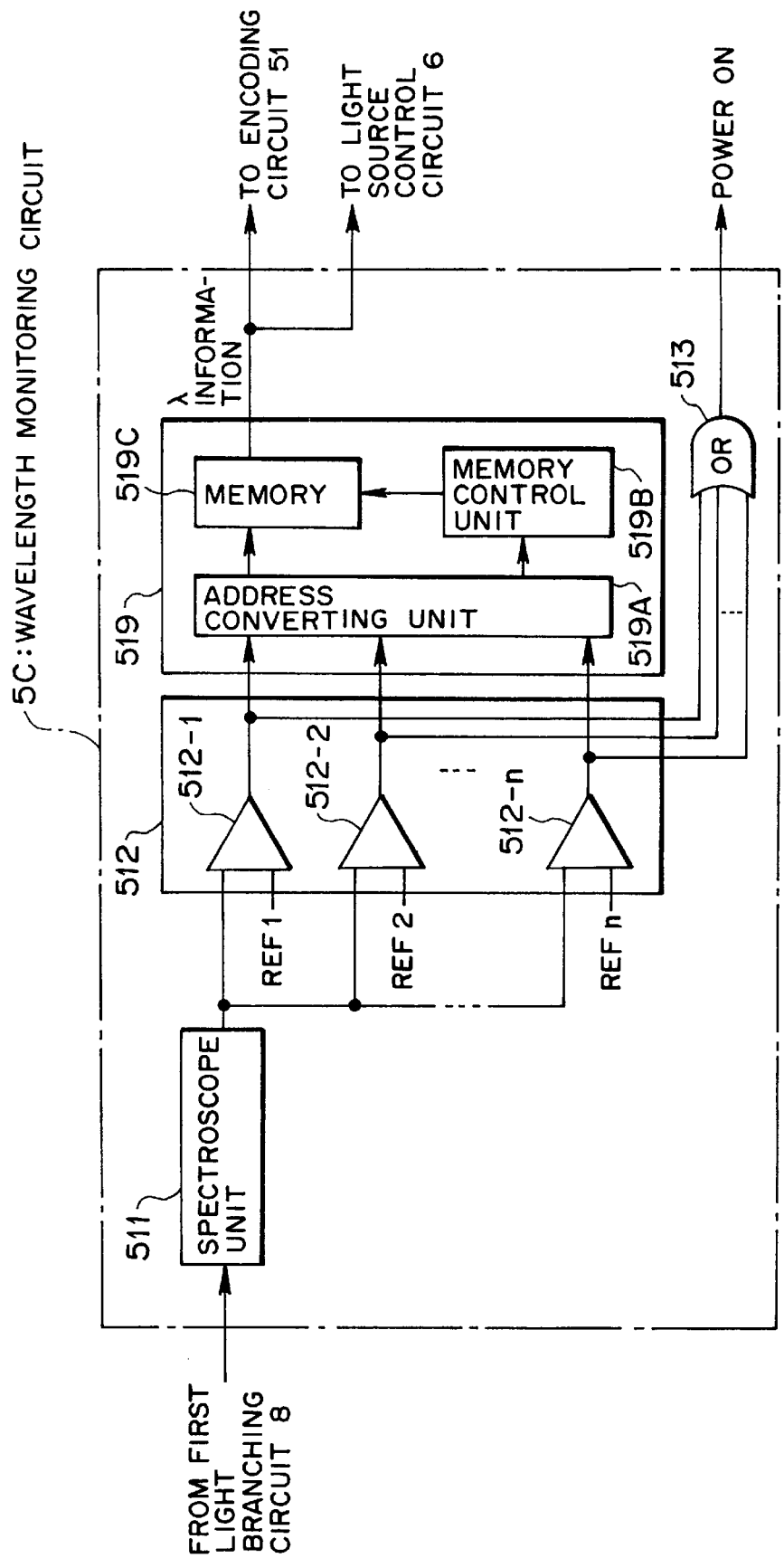
FIG. 17 is a block diagram showing a constitution of a third modified example of the multiple signal number detecting unit of the second embodiment of the present invention.

In the second embodiment, the wavelength monitoring circuit 5 (see FIG. 11) for detecting multiple signal number information for an input optical signal was described. However, for example, as shown in FIG. 17, a wavelength monitoring circuit 5C for detecting an input light level can be used for the present invention.

In this case, the wavelength monitoring circuit 5C includes a light receiver 511, a comparator 512, a logic circuit 513 and a wavelength information supplying unit 519. The light receiver 511 and the logic circuit 513 function in manners similar to those for the light receiver 500 and the logic circuit 503 shown in FIG. 11 and thus, detailed description thereof will be omitted.

The comparator 512 compares an output from the light receiver 511 with a specified reference value. The comparator 512 includes a plurality of comparator circuits 512-1 to 512-n so as to deal with a plurality of wavelengths (all the wavelengths λ1 to λn used in the transmission system). In this comparator 512, each wavelength is detected from the input level of an optical signal received by the light receiver 511.

The wavelength information supplying unit 519 outputs wavelength information based on an input light level obtained by comparison performed by the comparator 512. Specifically, the wavelength information supplying unit 519 includes an address converting unit 519A, a memory control unit 519B and a memory 519C.

The address converting unit 519A converts a signal from each of the comparator circuits 512-1 to 512-n into an address. The memory 519C stores wavelength information for each wavelength. The memory control unit 519B reads wavelength information from the memory 519C based on address information from the address converting unit 519A, the address information corresponding to the address in this case. The wavelength information from the memory 519C is outputted to the encoding circuit 51 and the light source control circuit 6.

The comparator 512, the logic circuit 513 and the wavelength information supplying unit 519 shown in FIG. 15 constitute a multiple signal number output unit. Multiple signal number information (wavelength information) is outputted from information regarding a light received by the light receiver 511 (received light level).

Therefore, with the wavelength monitoring circuit SC configured in the above-noted manner, since an input light level can be detected, compared with the optical amplifier for directly detecting a wavelength number, a circuitry can be simplified. Accordingly, the optical amplifier can be reduced in weight and costs.

(c2) Modified Example of the Light Source 7 in the Second Embodiment

Next, the modified example of the light source 7 in the second embodiment will be described. In the second embodiment, as shown in FIG. 18, the light source 7 having the plurality of light sources 7-1 to 7-n so as to deal with a plurality of wavelengths was described in detail. However, for example, as shown in FIG. 19, a light source 7A which can make a transmitted wavelength variable so as to deal with a plurality of wavelengths can be used for the present invention.

In this case, the light source 7A includes a plurality of wavelength variable light sources 7A-1 to 7A-m (m<n; equivalent to "total wavelength number-smallest operation wavelength number" during the operation of the transmission system). In each of these wavelength variable light sources 7A-1 to 7A-m, an optical signal having a wavelength equivalent to a wavelength which has not been inputted is outputted based on a control signal from a light source control circuit 6A. The light source control circuit 6A performs control based on a temperature or a current and outputs a control signal according to wavelength information. A code 72 shown in FIG. 19 denotes an optical coupler. This optical coupler 72 multiplexes an optical signal outputted from each of the wavelength variable light sources 7A-1 to 7A-m.

Figure 19:
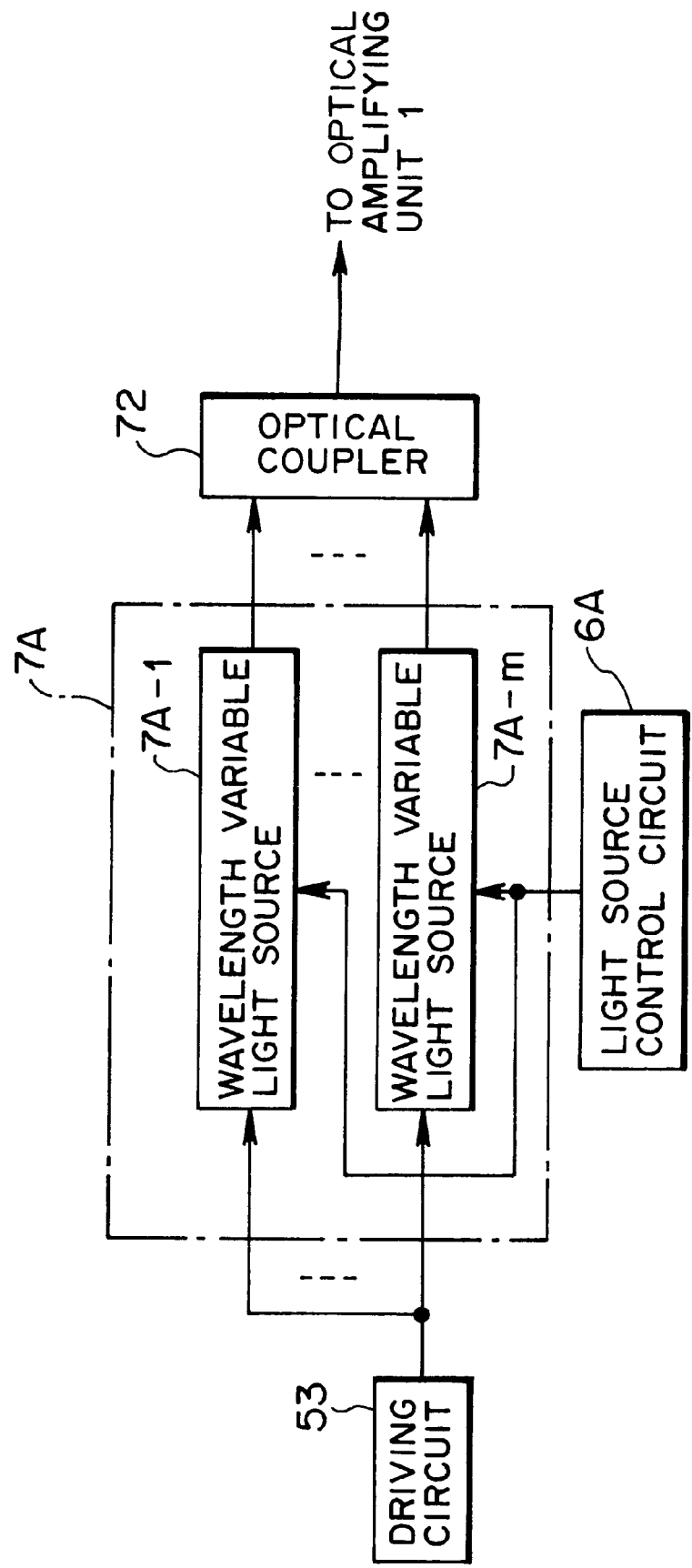
FIG. 19 is a block diagram showing a light source and its surrounding portion of the modified example of the second embodiment of the present invention.

Thus, with the light source 7A shown in FIG. 19, since a transmitted wavelength can be made variable, a circuitry can be reduced in size.

Accordingly, the entire optical amplifier can be reduced in size.

(c3) Others

The wavelength variable light sources 7A-1 to 7A-m provided in the light source 7A may be contained in a normal light source 7 (see FIG. 18), in which each of the light sources is fixed for each wavelength, as in the case of the second embodiment. In this case, wavelength control is performed by changing the temperature of each of these light sources (0.1 nm/° C., generally). In other words, the optical signal of a wavelength which has not been set can be dealt with by changing the temperatures of the other set light sources.

Therefore, compared with the use of the normal light source 7 in which each of the light sources is fixed for each wavelength like that shown in FIG. 18, the number of light sources to be installed can be reduced. Compared with the use of the wavelength variable light sources 7A-1 to 7A-m like that shown in FIG. 19, costs can be reduced. Accordingly, the optical amplifier can be reduced in size and weight.

Furthermore, in the second embodiment, the light sources 7 and 7A respectively include the pluralities of light sources 7-1 to 7-n and 7A-1 to 7A-m. However, each of these light sources 7 and 7A may include only one such light source. In this case, for a wavelength which has not been inputted (cut wavelength), input total power supplied to the optical amplifying unit 1 can be coincided with that during a normal period by increasing a current for this light source. Wavelength control is performed based on a temperature also in this case.

Therefore, since a light source for one wavelength can be used also for the other wavelengths, a circuitry can be greatly reduced in size.

(d) Third Embodiment of the Invention

Figure 20:
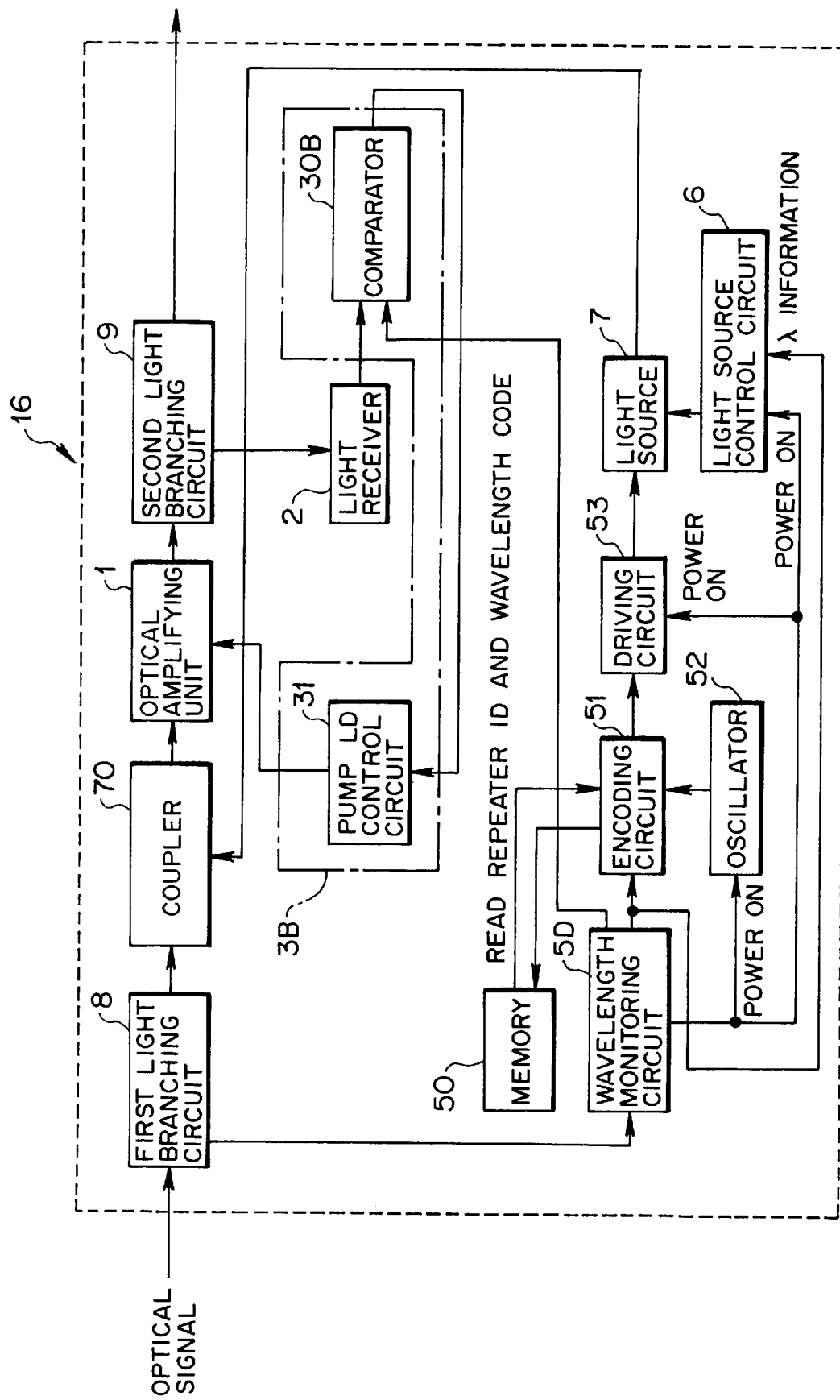
FIG. 20 is a block diagram showing a constitution of an optical amplifier of a third embodiment of the present invention.

Referring to FIG. 20 which is block diagram showing the constitution of the optical amplifier of the third embodiment of the present invention, a an optical amplifier 16 shown is obtained as a result of a gain control improvement made for the optical amplifying unit 1 of the second embodiment.

More particularly, in the second embodiment, the existing optical amplifying unit 1 is used by compensating for the shortage of an input optical signal by a compensating optical signal based on the multiplexed wavelength number of the signal which have not been inputted. On the other hand, in the third embodiment, the shortage of an input optical signal is compensated for by a compensating optical signal and the gain of the optical amplifying unit 1 is controlled based on the multiplexed wavelength number of the input optical signal (input light level).

A control unit 3B shown in FIG. 20 controls the optical amplifying unit 1 so as to cause the light output of the optical amplifying unit 1 to take a predetermined value. This control processing is performed by comparing the light output of the optical amplifying unit 1 monitored by a light receiver 2 with a specified reference value as in the cases of the control units 3 and 3A described above respectively with reference to FIGS. 4 and 10. The control unit 3B includes a comparator 30B and a pumping light source control circuit (PUMP LD CONTROL CIRCUIT) 31. Specifically, the comparator 30B performs comparison for an output from the light receiver 2 by using an output from a later-described wavelength monitoring circuit 5D as a reference value.

Figure 21:
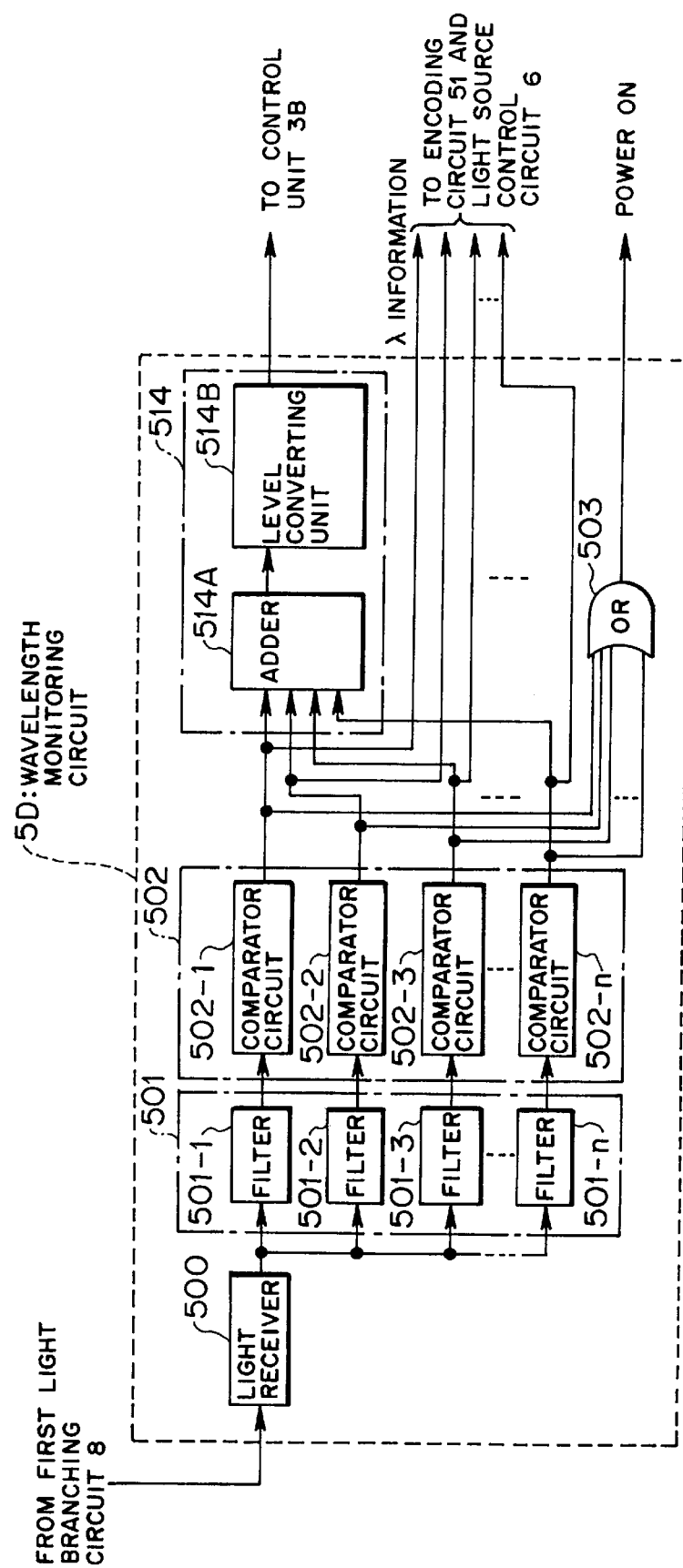
FIG. 21 a block diagram of an internal constitution of a multiple signal number detecting unit of the third embodiment of the present invention.

The wavelength monitoring circuit 5D detects information regarding the multiple signal number of an optical signal which has been inputted. As shown in FIG. 21, this wavelength monitoring circuit SD includes a light receiver 500, a filter unit 501, a comparator 502, a logic circuit 503 and a reference value change information supplying unit 514. In other words, the wavelength monitoring circuit 5D shown in FIG. 21 is composed by adding the reference value change information supplying unit 514 to the wavelength monitoring circuit 5 shown in FIG. 11.

The reference value change information supplying unit 514 supplies reference value change information to the control unit 3B according to detected multiple signal number information. This unit 514 includes an adder 514A and a level converting unit 514B. The adder 514A adds together outputs from a plurality of comparator circuits 502-1 to 502-n.

The level converting unit 514B converts information obtained by addition performed by the adder 514A into a reference value having a predetermined level. Specifically, this level converting unit 514B functions in a manner similar to that for the level converting unit 42 shown in FIG. 4. An output (reference value change information) from the level converting unit 514B is supplied to the control unit 3B. In the control unit 3B, this output is used as a reference value by the comparator 30B.

Thus, in the third embodiment, a compensating optical signal is supplied to the input side of the optical amplifying unit 1 according to information regarding the multiple signal number of an optical signal which has been inputted, a light output level is controlled to a specified level and the gain of the optical amplifying unit 1 is controlled according to the multiple signal number information (input light level).

According to the technology disclosed in the third embodiment, by simultaneously performing supplying of a compensating optical signal and controlling of the gain of the optical amplifying unit 1, a time needed until the compensating optical signal is normally started (transition state) can be shortened by the control operation of a feedback system which responds more quickly. In addition to the above-noted manner, the optical amplifier 16 can function in a manner described below.

In the optical amplifier 16 shown in FIG. 20, if the light source 7 is composed of one light source (only an optical signal for one wave is outputted), when an input optical signal is reduced by two waves or more, an optical signal of only one wave can be outputted from the light source 7. Accordingly, for two or more wavelengths, light amplification control is performed in the control unit 3B by changing the reference value.

In other words, the wavelength shortage of the optical signal can be sufficiently dealt with by performing the gain control (control processing performed by the feedback system) of the optical amplifying unit 1 in the control unit 3B even in the simply structured optical amplifier in which the light source 7 includes only one light source. It can thus be understood that light amplification control can be performed irrespective of the number of light sources installed in the light source 7 (compensating optical signal quantity).

Therefore, with the optical amplifier 16 constructed in the above-noted manner, since means for performing both supplying of a compensating optical signal and controlling of the gain of the optical amplifying unit 1 based on multiple signal number information is provided, a time needed until the compensating optical signal is normally started (transition state) can be shortened by a control operation performed by the feedback system which responds more quickly. Moreover, since the wavelength shortage of an optical signal can be adjusted by a control operation performed by the feedback system irrespective of the number of light sources installed in the light source 7 (compensating optical signal quantity), a circuitry can be reduced in size. Accordingly, degree of flexibility can be increased when a system is constituted.

(d1) Modified Examples of the Wavelength Monitoring Circuit 5D in the Third Embodiment In the optical amplifier 16 of the third embodiment, the wavelength monitoring circuit 5D is used as means for detecting the multiple signal number information of an optical signal which has been inputted. In this case, as means (modes) for detecting this multiple signal number information, for example the following three means [(A) to (C)] can also be used.

(A) First Modified Example of the Wavelength Monitoring Circuit 5D

Figure 22:
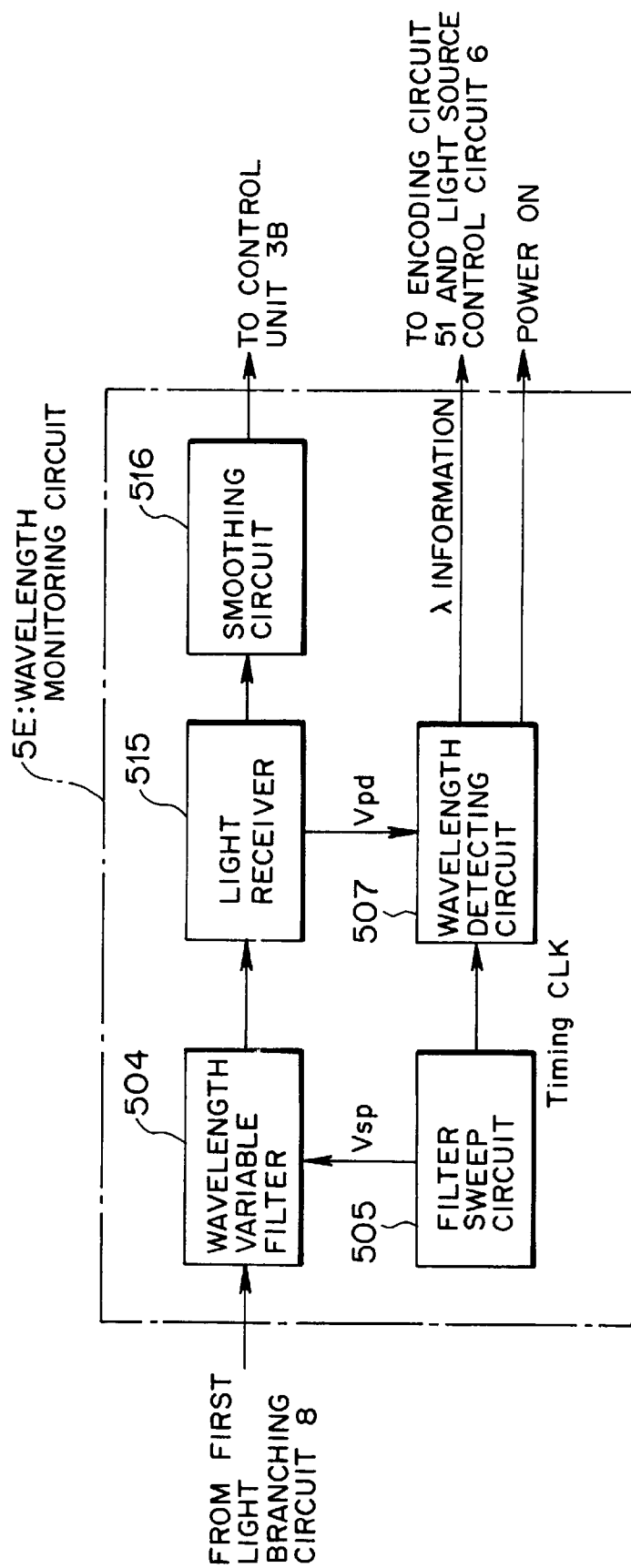
FIG. 22 is a block diagram showing a constitution of a first modified example of the multiple signal number detecting unit of the third embodiment of the present invention.

In the third embodiment, the wavelength monitoring circuit SD having the plurality of filters in the filter unit 501 so as to deal with the plurality of wavelengths was described in detail. However, a wavelength monitoring circuit 5E having a wavelength variable filter 504 for making a filter wavelength variable like that shown in FIG. 22 can be used for the present invention. In this case, the wavelength monitoring circuit SE includes, in addition to the wavelength variable filter 504, a filter sweep circuit 505, a light receiver 515, a wavelength detecting circuit 507 and a smoothing circuit 516.

In other words, the wavelength monitoring circuit 5E is configured by adding the smoothing circuit 516 to the wavelength monitoring circuit 5A shown in FIG. 12.

The light receiver 515 receives an optical signal which has been inputted via the wavelength variable filter 504 and converts this optical signal into an electric signal. The electric signal is outputted to the wavelength detecting circuit 507 and the later-described smoothing circuit 516.

Detection of the existence of all the input wavelengths by the wavelength variable filter 504 needs a specified period (fixed cycle). However, in the first modified example, as described above, wavelength detection information having a time range from the wavelength variable filter 504 is outputted as an electric signal from the light receiver 515 to the wavelength detecting circuit 507 and the smoothing circuit 516.

The smoothing circuit 516 performs an averaging operation for the output from the light receiver 515 (this output contains the wavelength detection information having a time range from the wavelength variable filter 504). An output from the smoothing circuit 516 is used as a reference value in the control unit 3B according to the number of multiplexed wavelengths.

In other words, the simply configured smoothing circuit 516 can output a reference value according to the number of multiplexed wavelengths without using a memory such as a shift register.

With the wavelength monitoring circuit 5E configured in the above-noted manner, since a reference value can be obtained by using the wavelength variable filter 504 for making a filter wavelength variable according to the result of wavelength detection and the number of multiplexed wavelengths, a circuitry can be reduced in size. Accordingly, the entire optical amplifier can be reduced in size and weight. Also, a reference value can be outputted by a simple configuration according to the number of multiplexed wavelengths even if a memory such as a shift register or the like is not used.

(B) Second Modified Example of the Wavelength Monitoring Circuit 5D

Figure 23:
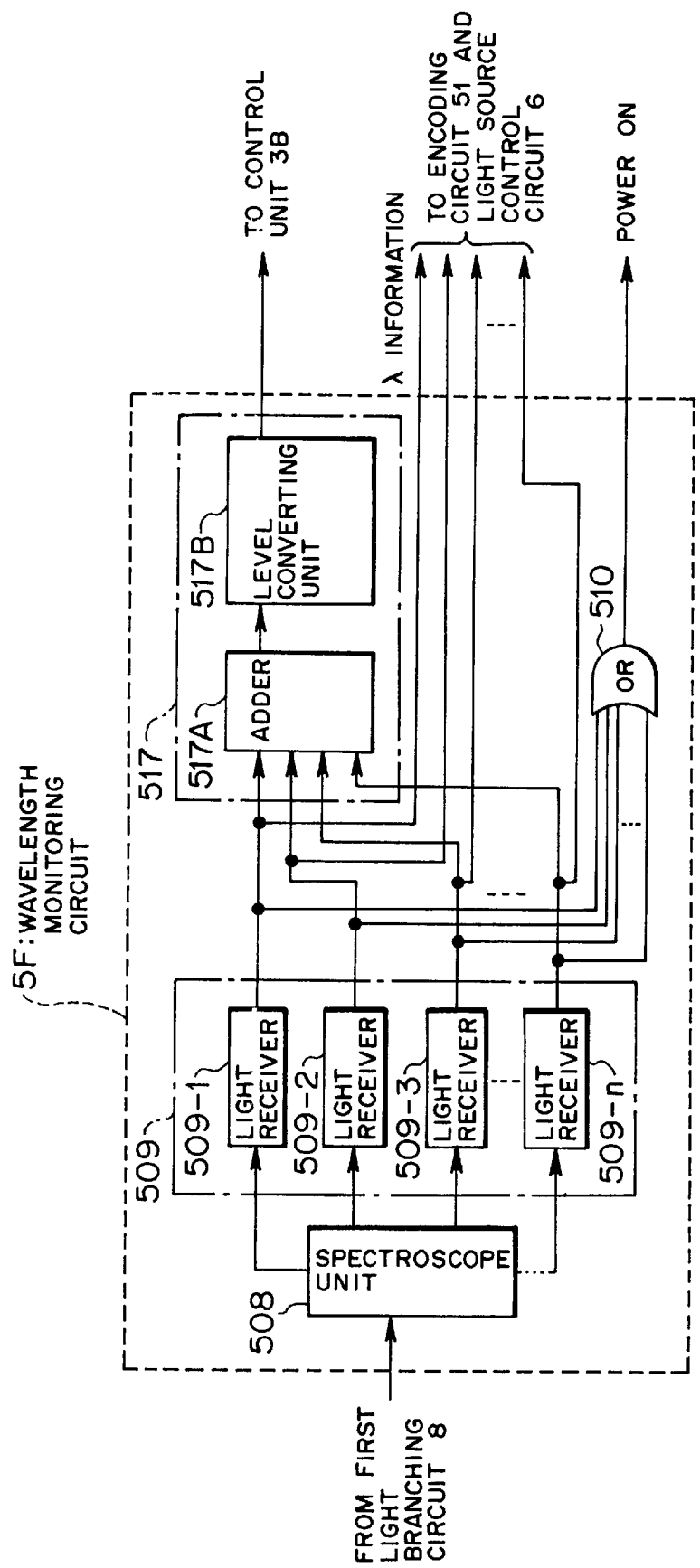
FIG. 23 is a block diagram showing a constitution of a second modified example of the multiple signal number detecting unit of the third embodiment of the present invention.

In the third embodiment and the first modified example (A), the wavelength monitoring circuit 5D having the plurality of filters 501-1 to 501-n and the wavelength monitoring circuit 5E having the wavelength variable filter 504 were respectively described in detail. However, a wavelength monitoring circuit 5F having a plurality of light receivers 509-1 to 509-n so as to deal with a plurality of wavelengths like that shown in FIG. 23 can be used for the present invention. In this case, the wavelength monitoring circuit 5F is configured by adding a reference value change information supplying unit 517 to the wavelength monitoring circuit 5B shown in FIG. 16.

The reference value change information supplying unit 517 supplies reference value change information to the control unit 3B according to detected multiple signal number information. This reference value change information supplying unit 517 includes an adder 517A and a level converting unit 517B. The adder 517A adds together outputs from the plurality of light receivers 509-1 to 509-n. The level converting unit 517B converts information obtained by addition performed by the adder 517A into a reference value having a predetermined level. Specifically, this converting unit 517B functions in a manner similar to that for the level converting unit 42 shown in FIG. 4. Its output (reference value change information) is supplied to the control unit 3B. In the control unit 3B, this information is used as a reference value by the comparator 30B.

With the wavelength monitoring circuit 5F configured in the above-noted manner, since optical signals which have been inputted can be individually received, wavelength information can be surely detected. Accordingly, degree of flexibility can be greatly increased when a system is constituted for the optical amplifier.

(C) Third Modified Example of the Wavelength Monitoring Circuit 5D

Figure 24:
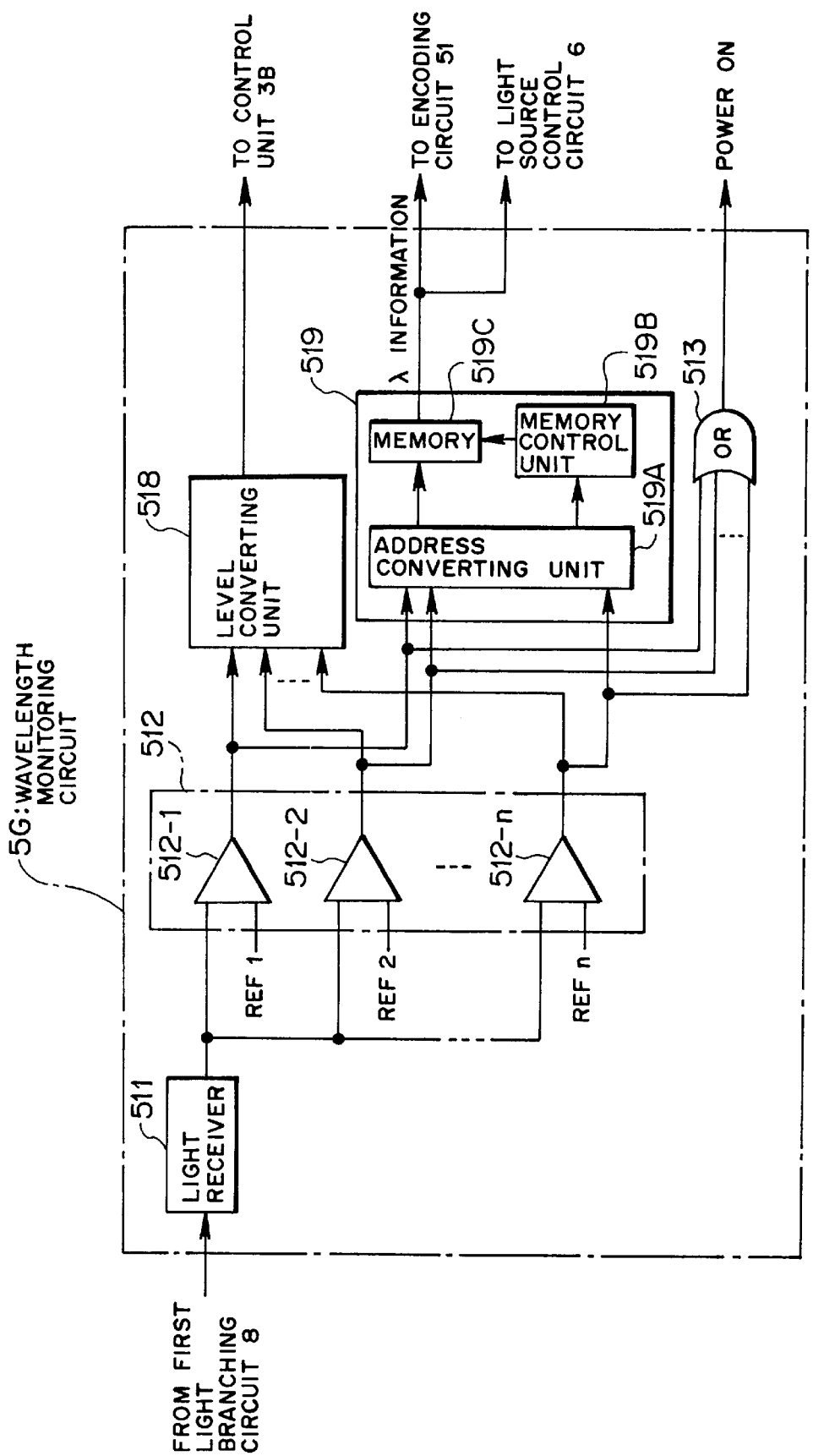
FIG. 24 is a block diagram showing a constitution of a third modified example of the multiple signal number detecting unit of the third embodiment of the present invention.

In the third embodiment, the wavelength monitoring circuit SD (see FIG. 21) for detecting the multiple signal number information of an optical signal which has been inputted was described in detail. However, a wavelength monitoring circuit 5G for performing not only detecting of an input light level but also changing of the reference value of the feedback system like that shown in FIG. 24 can be used for the present invention.

The wavelength monitoring circuit 5G is configured by adding a level converting unit 518 to the wavelength monitoring circuit 5C shown in FIG. 17. This level converting unit 518 functions in a manner similar to that for the level converting unit 42 shown in FIG. 4 and thus, description thereof will be omitted.

With the wavelength monitoring circuit 5G configured in the above-noted manner, since an input light level can be detected, a circuitry can be simplified compared with the optical amplifier for directly detecting the number of wavelengths. Accordingly, the optical amplifier can be reduced in weight and costs. Further, with this wavelength monitoring circuit 5G, since the reference value of the feedback system can be changed, the operational speed of the entire amplifier can be made faster.

(e) Others

The wavelength monitoring circuits 5 and 5A to 5G and the light sources 7 (7-1 to 7-n) and 7A (7A-1 to 7A-m) of the second and third embodiments are not limited to the above-described combinations. These elements can be freely combined together. Therefore, a necessary circuit can be configured according to conditions to be used and degree of flexibility can be greatly increased when a system is constituted for the optical amplifier.

What is claimed is:

1. An optical amplifier for amplifying a wavelength multiplexed signal obtained by multiplexing an optical signal having a plurality of wavelengths and controlling an amplification gain so as to cause an amplified output to take a constant value, said optical amplifier comprising:

an optical amplifying unit for amplifying an optical signal to be inputted;

a light output monitoring unit for monitoring a light output of said optical amplifying unit;

a control unit for controlling said optical 15 amplifying unit by comparing said light output of said optical amplifying unit monitored by said light output monitoring unit with a specified reference value so as to cause said light output of said optical amplifying unit to take a predetermined output value; and an input light level detecting unit for detecting an input light level of said optical signal to be inputted, wherein said control unit controls a light output level of said optical amplifying unit by changing said reference value used for comparison according to said input light level detected by said input light level detecting unit.

2. An optical amplifier as claimed in claim 1, wherein said input light level detecting unit includes a light receiving unit for receiving said optical signal to be inputted and a reference value change information supplying unit for supplying a reference value change information to said control unit by comparing information regarding a received light detected by said light receiving unit with a preset auxiliary reference value according to a multiple signal number.

3. An optical amplifier as claimed in claim 1, wherein said input light level detecting unit includes a light receiving unit for receiving said optical signal to be inputted, a received light change information arithmetic unit for calculating information regarding a change in received light information detected by said light receiving unit between two points of time and a reference value change information supplying unit for supplying reference value change information to said control unit by comparing said received light information detected by said light receiving unit with a preset auxiliary reference value according to a multiple signal number using said change information of said received light information between said two points of time as a trigger signal.

4. An optical amplifier for amplifying a wavelength multiplexed signal obtained by multiplexing an optical signal having a plurality of wavelengths, said optical amplifier being constructed in a manner that a light output level of said optical amplifier is controlled to a specified level by supplying a compensating optical signal to an input side of an optical amplifying unit according to information regarding a multiple signal number of an optical signal to be inputted.

5. An optical amplifier for amplifying a wavelength multiplexed number obtained by multiplexing an optical signal having a plurality of wavelengths, said optical amplifier comprising:

an optical amplifying unit for amplifying an optical signal to be inputted;

a light output monitoring unit for monitoring a light output of said optical amplifying unit;

a control unit for controlling said optical amplifying unit by comparing said light output of said optical amplifying unit monitored by said light output monitoring unit with a specified reference value so as to cause said light output of said optical amplifying unit to take a predetermined output value;

a multiple signal number detecting unit for detecting information regarding a multiple signal number of said optical signal to be inputted;

a compensating optical signal generation light source for supplying a compensating signal to an input side of said optical amplifying unit; and a light source control unit for controlling said compensating optical signal generation light source according to said multiple signal number information detected by said multiple signal number detecting unit so as to cause said light source to output said compensating optical signal which causes a light output level of said optical amplifying unit to take a specified level.

6. An optical amplifier as claimed in claim 5, wherein said multiple signal number detecting unit includes a light receiving unit for receiving said optical signal to be inputted and a filter unit for detecting multiple signal number information from information regarding a received light detected by said light receiving unit.

7. An optical amplifier as claimed in claim 6, wherein said filter unit includes a plurality of filters in order to deal with said plurality of wavelengths.

8. An optical amplifier as claimed in claim 5, wherein said multiple signal number detecting unit includes a wavelength variable filter for making a filter wavelength variable in order to deal with said plurality of wavelengths.

9. An optical amplifier as claimed in claim 5, wherein said multiple signal number detecting unit includes a spectroscope unit for dividing said optical signal to be inputted into portions by considering wavelengths and a light receiving unit for individually receiving said portions of said optical light obtained by said division performed by said spectroscope unit.

10. An optical amplifier as claimed in claim 5, wherein said multiple signal number detecting unit includes a light receiving unit for receiving said optical signal to be inputted and a multiple signal number outputting unit for outputting multiple signal number information from information regarding a received light detected by said light receiving unit.

11. An optical amplifier as claimed in claim 5, wherein said compensating optical signal generation light source includes a plurality of light sources in order to deal with said plurality of wavelengths.

12. An optical amplifier as claimed in claim 5, wherein said compensating optical signal generation light source includes a light source for making a transmitted wavelength variable in order to deal with said plurality of wavelengths.

13. An optical amplifier as claimed in claim 5, wherein said compensating optical signal generation light source supplies a compensating optical signal containing bits of control information superimposed on each other to said input side of said optical amplifying unit.

14. An optical amplifier for amplifying a wavelength multiplexed signal obtained by multiplexing an optical signal having a plurality of wavelengths, said optical amplifier being constructed in a manner that a compensating optical signal is supplied to an input side of an optical amplifying unit and a light output level of said optical amplifier is controlled according to information regarding a multiple signal number of an optical signal to be inputted.

15. An optical amplifier for amplifying a wavelength multiplexed signal obtained by multiplexing an optical signal having a plurality of wavelengths, said optical amplifier comprising:

an optical amplifying unit for amplifying an optical signal to be inputted;

a light output monitoring unit for monitoring a light output of said optical amplifying unit;

a control unit for controlling said optical amplifying unit by comparing said light output of said optical amplifying unit monitored by said light output monitoring unit with a specified reference value so as to cause said light output of said optical amplifying unit to take a predetermined output value;

a multiple signal number detecting unit for detecting information regarding a multiple signal number of said optical signal to be inputted;

a compensating optical signal generation light source for supplying a compensating optical signal to an input side of said optical amplifying unit; and a light source control unit for controlling said compensating optical signal generation light source according to said multiple signal number information detected by said multiple signal number detecting unit so as to cause said light source to output said compensating optical signal which causes a light output level of said optical amplifying unit to take a specified level, wherein said control unit controls said light output level of said optical amplifying unit by changing said reference value used for comparison according to said multiple signal number information of said optical signal to be inputted, which is detected by said multiple signal number detecting unit.

16. An optical amplifier as claimed in claim 15, wherein said multiple signal number detecting unit includes a reference value change information supplying unit for supplying reference value change information to said control unit according to said detected multiple signal number information.

* * * * *